United States Patent
Shea et al.

(10) Patent No.: US 8,975,358 B2
(45) Date of Patent: Mar. 10, 2015

(54) COMPOSITIONS AND METHODS FOR SYNTHESIS OF ORGANIC-SILICA HYBRID MATERIALS

(75) Inventors: Kenneth J. Shea, Irvine, CA (US); Li-Chih Hu, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/811,445

(22) PCT Filed: Jul. 18, 2011

(86) PCT No.: PCT/US2011/044321
§ 371 (c)(1),
(2), (4) Date: Feb. 6, 2013

(87) PCT Pub. No.: WO2012/012311
PCT Pub. Date: Jan. 26, 2012

(65) Prior Publication Data
US 2013/0130034 A1    May 23, 2013

Related U.S. Application Data

(60) Provisional application No. 61/366,967, filed on Jul. 23, 2010.

(51) Int. Cl.
| | |
|---|---|
| *C08G 77/50* | (2006.01) |
| *C08L 83/00* | (2006.01) |
| *C08G 77/52* | (2006.01) |
| *C08G 77/54* | (2006.01) |
| *C08J 3/12* | (2006.01) |

(52) U.S. Cl.
CPC ............... *C08L 83/00* (2013.01); *C08G 77/50* (2013.01); *C08G 77/52* (2013.01); *C08G 77/54* (2013.01); *C08J 3/12* (2013.01); *C08J 2383/04* (2013.01)
USPC .............................................. 528/35; 528/21

(58) Field of Classification Search
None
See application file for complete search history.

(56) References Cited

U.S. PATENT DOCUMENTS

| | | | |
|---|---|---|---|
| 2005/0285290 A1 | 12/2005 | Nakanishi | |
| 2007/0178319 A1* | 8/2007 | Hamada et al. | 428/447 |
| 2012/0141789 A1* | 6/2012 | Wyndham et al. | 428/402 |

FOREIGN PATENT DOCUMENTS

WO    WO 2009/010945 A2 *    1/2009

OTHER PUBLICATIONS

"Periodic Mesoporous Organosilica Spheres: Novel Synthesis and Characterization" authored by Rebbin et al. and published in Studies in Surface Science and Catalysis (2004) 154A (Recent Advances in the Science and Technology of Zeolites and Related Materials) 568-572.*
Zhong & Maye, "Core—Shell Assembled Nanoparticles as Catalysts," Adv. Mater., 2001, 13(19):1507-1511.
Zhu et al., "Spiropyran-Based Photochromic Polymer Nanoparticles with Optically Switchable Luminescence," J. Am. Chem. Soc., 2006, 128(13):4303-4309.
International Search Report and Written Opinion mailed Apr. 6, 2012 for PCT/US2011/044321, 10 pages.
Arkhireeva & Hay, "Synthesis of sub-200 nm silsesquioxane particles using a modified Stöber sol—gel route," J. Mater Chem. 2003, 13(12):3122-3127.
Arkhireeva et al., "Synthesis of Organic-Inorganic Hybrid Particles by Sol-Gel Chemistry," J. Sol-GeiSci. Technol. 2004, 31:31-36.
Barbe et al., "Silica Particles: A Novel Drug-Delivery System," Adv. Mater., 2004, 16(21):1959-1966.
Beydoun et al., "Role of Nanoparticles in Photocatalysis," Nanopart. Res., 1999, 1(4):439-458.
Bharali et al., "Organically modified silica nanoparticles: a nonviral vector for in vivo gene delivery and expression in the brain," Proc. Nat. Acad. Sci. USA, 2005, 102(32):11539-11544.
Bogush & Zukoski, "Studies of the kinetics of the precipitation of uniform silica particles through the hydrolysis and condensation of silicon alkoxides," Colloid Interface Sci., 991, 142(1):1-18.
Cerveau et al.,"Rigid rod molecules containing two Si(OMe)3 or SiMe(OMe)2 groups for hybrid materials synthesis," J. Organomet. Chem,. 2001, 626:92-99.
Choi et al., "Formation and Characterization of Monodisperse, Spherical Organo-Silica Powders from Organo-Alkoxysilane-Water System," J. Am. Ceram. Soc,. 1998, 81(5):1184-1188.
Green et al.,"Size, volume fraction, and nucleation of Stober silica nanoparticles," J. Colloid Interface Sci., 2003, 266 (2):346-358.
Guihen & Glennon, "Nanoparticles in Separation Science—Recent Developments," Anal. Lett., 2003, 36:3309-3336.
Haag, "Supramolecular Drug-Delivery Systems Based on Polymeric Core—Shell Architectures," Angew. Chem. Int. Ed. 2004, 43(3):278-282.
Jang et al., "Fabrication of Polypyrrole—Poly(N-vinylcarbazole) Core—Shell Nanoparticles with Excellent Electrical and Optical Properties," Adv. Mater., 2005, 17(11):1382-1386.
Kaltenpoth et al., ""Conductive Core—Shell Particles: An Approach to Self-Assembled Mesoscopic Wires,"" Adv. Mater 2003,15(13)1113-1118.

(Continued)

*Primary Examiner* — Marc Zimmer
(74) *Attorney, Agent, or Firm* — Casimir Jones S.C.

(57) ABSTRACT

The present invention relates to compositions and methods for synthesis of organic-silica hybrid microparticles and nanoparticles. In particular, the present invention provides compositions and methods for particle size control during synthesis of organic-silica hybrid microparticles and nanoparticles.

9 Claims, 21 Drawing Sheets

(56) References Cited

OTHER PUBLICATIONS

Katagiri et al., "Preparation of Transparent Thick Films by Electrophoretic Sol-Gel Deposition Using Phenyltriethoxysilane-Derived Particles," J. Am. Ceram. Soc. 1998, 81(9):2501-2503.
Khiterer & Shea, "Spherical, Monodisperse, Functional Bridged Polysilsesquioxane Nanoparticles," J. Nano Lett., 2007, 7(9):2684-2687.
Kim & Zukoski, "A model of growth by hetero-coagulation in seeded colloidal dispersions," J. Colloid Interface Sci. 1990, 139:198-212.
Lee et al., "Dual-Mode Nanoparticle Probes for High-Performance Magnetic Resonance and Fluorescence Imaging of Neuroblastoma," J. Angew. Chem. mt. Ed., 2006, 45(48):8160-8162.
Liu et al., "Preparation and characterization of copolymerized aminopropyl/phenylsilsesquioxane microparticles," Eur. Polym. J., 2005, 41(5):996-1001.
Loy & Shea, "Bridged Polysilsesquioxanes. Highly Porous Hybrid Organic-Inorganic Materials," J. Chem. Rev. 1995, 95(5):1431-1442.
Loy et al, "Dialkylene Carbonate-Bridged Polysilsesquioxanes. Hybrid Organic-Inorganic Sol-Gels with a Thermally Labile Bridging Group," Chem Mater., 1999, 11(11):3333-3341.
Lu et al., "Magnetic Nanoparticles: Synthesis, Protection, Functionalization, and Application," Angew. Chem. mt. Ed 2007, 46(8):1222-1244.
Lu et al., "Bifunctional Magnetic Silica Nanoparticles for Highly Efficient Human Stem Cell Labeling," Nano Lett., 2007, 7:149-154.
Ma et al., "Synthesis and characterization of micron-sized monodisperse superparamagnetic polymer particles with amino groups," Polym. Sci., Part A: Polym. Chem, 2005, 43:3433-3439.
Matsoukas & Gulari, "Self-sharpening distributions revisited—polydispersity in growth by monomer addition," J. Colloid Interface Sci., 1991, 145(2):557-562.
Matsoukas & Gulari, "Monomer-addition growth with a slow initiation step: A growth model for silica particles from alkoxides," J. Colloid Interface Sci., 1989, 132(1):13-21.
Matsuda et al., "Preparation of Copolymerized Phenylsilsesquioxane-Benzylsilsesquioxane Particles," J. Sol-Gel Sd. Technol. 2002, 23, 247-252.
Murata et al., "Synthesis of aryltriethoxysilanes via rhodium(I)-catalyzed cross-coupling of aryl electrophiles with triethoxysilane," Tetrahedron 2007, 63(19):4087-4094.
Ow et al., "Bright and Stable Core-Shell Fluorescent Silica Nanoparticles," Nano Lett. 2005, 5(1):113-117.
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films," Macromolecules, 2003, 36(14):5094-5104.
Roy et al., "Ceramic-Based Nanoparticles Entrapping Water-Insoluble Photosensitizing Anticancer Drugs: A Novel Drug-Carrier System for Photodynamic Therapy," J. Am. Chem. Soc., 2003, 125(26):7860-7865.
Roy et al., "Optical tracking of organically modified silica nanoparticles as DNA carriers: a nonviral, nanomedicine approach for gene delivery," Proc. Nat. Acad. Sci. USA., 2005, 102(2):279-284.
Santra et al., "Synthesis and Characterization of Fluorescent, Radio-Opaque, and Paramagnetic Silica Nanoparticles for Multimodal Bioimaging Applications," Adv. Mater, 2005, 17(18):2165-2169.
Sengupta et al., "Temporal targeting of tumour cells and neovasculature with a nanoscale delivery system," Nature, 2005, 436(7050):568-572.
Shea & Loy, "Bridged Polysilsesquioxanes. Molecular-Engineered Hybrid Organic-Inorganic Materials," Chem. Mater., 2001, 13:3306-3319.
Shea et al., "Arylsilsesquioxane gels and related materials. New hybrids of organic and inorganic networks," J. Am. Chem. Soc., 1992, 114(17):6700-6710.
Shea et al., "Bridged Polysilsesquioxanes. Molecular-Engineering Nanostructured Hybrid Organic-Inorganic Materials," Functional Hybrid Materials, eds. Gomez-Romero & Sanchez, 2004, pp. 50-85.
Singh et al., "Cationic microparticles: A potent delivery system for DNA vaccines," Proc. Nat. Acaci Sci. USA. 2000, 97:811-816.
Smith et al., "Bioconjugated silica-coated nanoparticles for bioseparation and bioanalysis," TrAC Trends Anal. Chem., 2006, 25(9):848-855.
Stober et al., "Controlled Growth of Monodisperse Silica Spheres in the Micron Size Range," Colloid Interface Sci., 1968, 26:62-69.
Toprak et al., "Spontaneous Assembly of Magnetic Microspheres," Adv Mater 2007, 19(10):1362-1368.
Unger et al., "Synthesis of spherical porous silicas in the micron and submicron size range: challenges and opportunities for miniaturized high-resolution chromatographic and electrokinetic separations," J. Chromatogr. A, 2000, 892:47-55.
Van Blaaderen et al., "Monodisperse colloidal silica spheres from tetraalkoxysilanes: Particle formation and growth mechanism," J. Colloid Interface Sci., 1992, 154:481-501.
Wang et al., "Molecularly engineered poly(ortho ester) microspheres for enhanced delivery of DNA vaccines," Nat. Mater., 2004, 3(3):190-196.
Wright & Sommerdijk, In Sol-Gel Materials. Chemistry and Applications; Phillips, D., O'Brien, P., Roberts, S., Eds.; CRC Press: New York, 2001; vol. 4, p. 43-53.
Xu et al., "Development of High Magnetization Fe3O4/Polystyrene/Silica Nanospheres via Combined Miniemulsion/Emulsion Polymerization," J. Am. Chem. Soc. 2006, 128(49):15582-15583.
Yan et al., "Biocompatible, Hydrophilic, Supramolecular Carbon Nanoparticles for Cell Delivery," Adv. Mater., 2006, 18 (18):2373-2378.
Yi et al., "Nanoparticle Architectures Templated by SiO2/Fe2O3 Nanocomposites," Chem. Mater., 2006, 18(3):614-619.
Yoon et al., "Multifunctional Nanoparticles Possessing a "Magnetic Motor Effect" for Drug or Gene Delivery," Angew. Chem. In. Ed.. 2005, 44(7):1068-1071.
Zhao et al., "Photodeformable Spherical Hybrid Nanoparticles," J. Am. Chem. Soc., 2006, 128(44):14250-14251.
Zhao et al., "Photoresponsive Hybrid Materials: Synthesis and Characterization of Coumarin-Dimer-Bridged Polysilsesquioxanes," J. Chem. Mater., 2008, 20(5):1870-1876.

* cited by examiner 1P 44 nm 1P 590 nm 2P 36 nm 2P 620 nm 3P 70 nm 3P 440 nm

COMPOSITIONS AND METHODS FOR SYNTHESIS OF ORGANIC-SILICA HYBRID MATERIALS

The present application claims priority to U.S. Provisional application Ser. No. 61/366,967, filed Jul. 23, 2010, which is herein incorporated by reference in its entirety.

FIELD OF THE INVENTION

The present invention relates to compositions and methods for synthesis of organic-silica hybrid microparticles and nanoparticles. In particular, the present invention provides compositions and methods for particle size control during synthesis of organic-silica hybrid microparticles and nanoparticles.

BACKGROUND OF THE INVENTION

Hybrid organic-inorganic materials consist of inorganic (e.g. oxides) and organic (e.g. small molecules, macromolecules, etc.) components. They benefit from the thermal and chemical stability and strength of inorganic components (e.g. oxides), while exhibiting the elasticity and functionality of organic molecules. Due to the synergistic advantages, many research groups have attempted to develop novel hybrid materials with enhanced properties by carefully designing the chemical composition and controlling structure growth.

Bridged polysilsesquioxanes (BPS) (Shea, K. J.; Loy, D. A. Chem. Mate, 2001, 13, 3306-3319. (b) Shea, K. J.; Loy, D. A.; Webster, 0. 1 J. Am. Chem. Soc. 1992, 114, 6700-67 10; herein incorporated by reference in their entireties) are materials with silicon-oxide networks and organic bridging groups. Synthesized with sol-gel chemistry from organo-bridged bis-trialkoxysilanes ((R'O)$_3$Si—R—Si(OR')$_3$) the organic and inorganic domains in the material are dispersed at the molecular level. The organic group provides an opportunity to control bulk properties such as refractive index, optical clarity, hydrophobicity, dielectric constant, thermal stability and chemical function. Moreover, compared to organic modified ceramics (ORMOCER®) synthesized from R—Si(OR)$_3$, the organic bridging group in BPS, serving as a spacer between two Si—O linkage groups, often provide significant and well-modulated porosity, allowing the use of "inner surfaces" (up to ~1000 m$^2$/g) of materials.

Recent developments for preparing functional materials as spherical microparticles and/or nanoparticles have broadened the potential applications and enhanced the performance of these materials significantly. Small, uniform spherical particles are widely used in separations, for drug and gene delivery (Barbe et al. Adv. Mater 2004, 16, 1959-1966.; Singh et al. Proc. Nat. Acaci Sci. USA. 2000, 97, 811-816.; Roy et al. Proc. Nat. Acad. Sci. USA. 2005, 102, 279-284.; Bharali et al. Proc. Nat. Acad. Sci. USA. 2005, 102, 11539-11544.; Roy et al. J. Am. Chem. Soc. 2003, 125, 7860-7865.; Wang et al. Nat. Mater 2004, 3,190-196.; Sengupta et al. Nature 2005, 436, 568-572.; Haag. Angew. Chem. mt. Ed 2004, 43, 278-282.; Yoon et al. Angew. Chem. In,'. Ed 2005, 44, 1068-1071.; Yan et al. Adv. Mater 2006, 18, 2373.; herein incorporated by reference in their entireties), bioimaging (Santra et al. Adv. Mater 2005, 17, 2165-2169.; Lee et al. J. Angew. Chem. mt. Ed. 2006, 45, 8160-8162.; herein incorporated by reference in their entireties), catalysis (Beydoun et al. Nanopart. Res. 1999, 1, 439-458; Zhong et al. Adv. Mater 2001, 13, 1507.; herein incorporated by reference in their entireties), and for optical (Zhu et al. J. Am. Chem. Soc. 2006, 128, 4303-4309.; Ow et al. Nano Lett. 2005, 5, 113-117.; herein incorporated by reference in their entireties), electronic (Kaltenpoth et al. Adv. Mater 2003, 15, 1113-1118.; Jang et al. Adv. Mater 2005, 17, 1382-1386.; herein incorporated by reference in their entireties), and magnetic (Yi et al. Chem. Mater 2006, 18, 614-619.; Lu et al. Angew. Chem. mt. Ed 2007, 46, 1222-1244.; Toprak et al. Adv Mater 2007, 19, 1362.; Ma et al. Polym. Sci., Part A: Polym. Chem 2005, 43, 3433-3439.; Xu et al. J. Am. Chem. Soc. 2006, 128, 15582-15583.; Lu et al. Nano Lett. 2007, 7, 149-154.; herein incorporated by reference in their entireties) applications. Recently, BPS were also prepared as xerogel nanoparticles by self-assembly or in a variety of emulsion methods (Khiterer, M.; Shea, K. J. Nano Lett. 2007, 7, 2684-2687; herein incorporated by reference in its entirety). These nanoparticles can be used as photodeformable materials or components in electrochromic devices. However, the emulsion method is suitable only when water-in-oil emulsions are used for ionic and water soluble monomers. Hydrophobic monomers become amphiphilic after hydrolysis, thus not constrained in micelles. Since most of bridged silane monomers are water-insoluble, new methods are needed in the field to prepare BPS in uniform, spherical particles.

The Stöber process, first reported in 1968 (Stober et al. Colloid Interface Sci. 1968, 26, 62-69.; herein incorporated by reference in its entirety), yields monodisperse spherical non-porous silica particles by the hydrolysis and condensation of Si(OEt)$_4$ in mixtures of ammonia, alcohol and small amounts of water. ORMOSIL particles can be prepared by a method similar to the Stöber process (Choi et al. J. Am. Ceram. Soc. 1998, 81, 1184-1188.; Katagiri et al. J. Am. Ceram. Soc. 1998, 81, 2501-2503.; Matsuda et al. J. Sol-Gel Sd. Technol. 2002, 23, 247-252.; Liu et al. Eur: Polym. 1 2005, 4), 996-1001.; Arkhireeva & Hay, J. Mater Chem. 2003, 13, 3122-3127.; Arkhireeva et al. J. Sol-GeiSci. Technol. 2004, 31, 31-36.; herein incorporated by reference in their entireties), in which aqueous ammonium hydroxide (without alcohol) is used as solvent. During the reaction, the monomer "oil droplets" are gradually consumed, while a turbid suspension of organic-silica particles emerges in the aqueous phase.

SUMMARY OF THE INVENTION

In some embodiments, the present invention provides a composition comprising microscale or smaller hybrid inorganic-organic particles. In some embodiments, the particles are mondisperse. In some embodiments, the particles comprise microparticles. In some embodiments, the particles comprise nanoparticles. In some embodiments, the particles are spherical or substantially spherical. In some embodiments, the particles comprise bridged polysilsesquioxane. In some embodiments, polysilsesquioxanes are bridged by an aliphatic group, aromatic group, or tertiary-amine group. In some embodiments, polysilsesquioxanes are bridged by hexane. In some embodiments, polysilsesquioxanes are bridged by dipropylmethylamine. In some embodiments, polysilsesquioxanes are bridged by 1,4-diethylbenzene.

In some embodiments, the present invention provides a method of preparing mondisperse particles comprising: (a) providing: (i) a solution of ammonia, water, and alcohol, and (ii) bridged silane monomers; and (b) mixing the water/alcohol/ammonia solution and the bridged silane monomers until a single-phase suspension is produced. In some embodiments, the alcohol comprises 1-propanol. In some embodiments, mixing is performed above room temperature. In some embodiments, mixing is performed at approximately 60° C. In some embodiments, the present invention further comprises a step of (c) allowing said suspension to cool to room temperature. In some embodiments, the mondisperse particles comprise bridged polysilsesquioxanes. In some embodiments, the mondisperse particles are less than 1.5 µm in diameter. In some embodiments, the mondisperse particles are greater than 15 nm in diameter. In some embodiments, the mondisperse particles exhibit significant porosity.

DEFINITIONS

Figure 1:
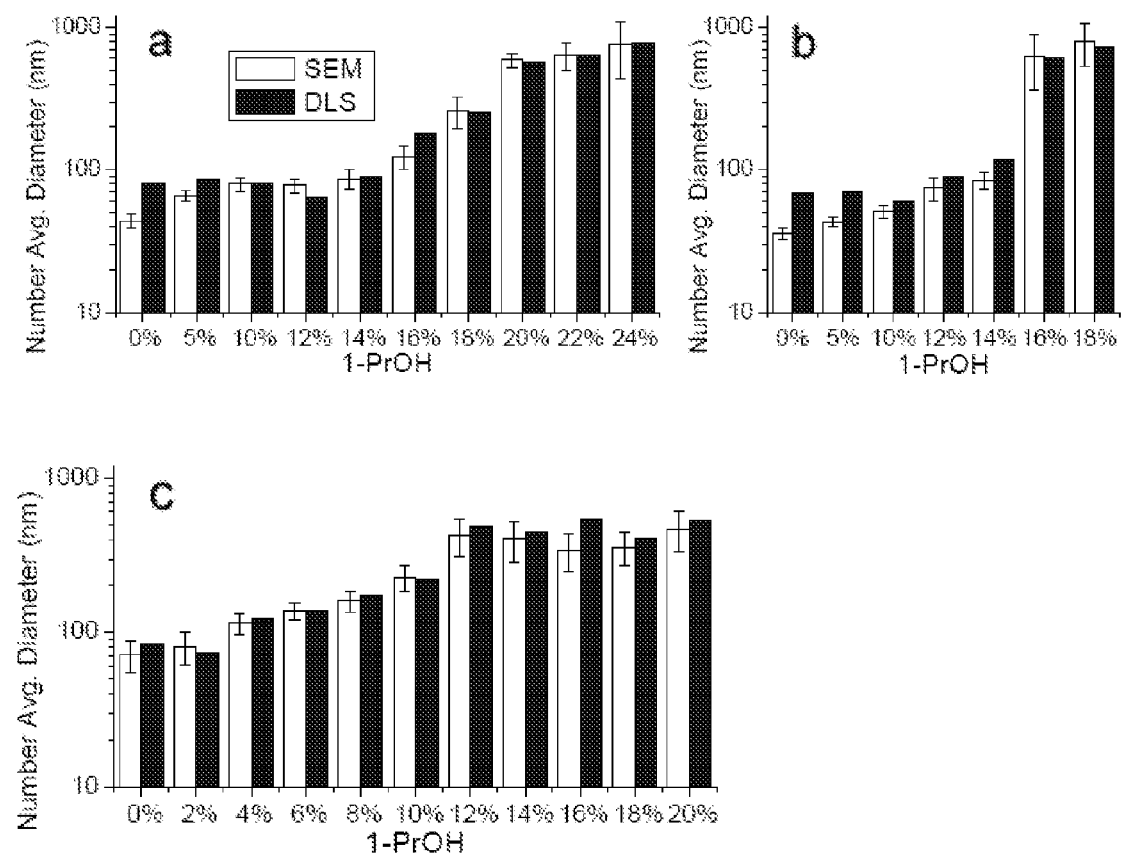
FIG. 1 shows a graph of the size of BPS nanoparticles (a) 1P (b) 2P (c) 3P as a function of $H_2O$ 1-PrOH ratio in the polymerization process.

To facilitate an understanding of the invention, a number of terms are defined below.

As used herein, the term "nanostructure" refers to a structure having a height, width, and/or diameter that can be measured on a nanoscale (e.g. measured in nanometers to hundreds of nanometers, generally less than 1 micron).

As used herein, the term "nanoparticle" refers to particles, groups of particles, particulate molecules (e.g. small individual groups of loosely associated groups of molecules), and groups of particulate molecules that while potentially varied in specific geometric shape have an effective, or average, diameter that can be measured on a nanoscale (e.g. measured in nanometers (nm) to hundreds of nanometers, generally less than 1 micron).

As used herein, the term "surface-modified nanoparticle" refers to a nanoparticle that includes surface groups (e.g. chemical substituents, proteins, nucleic acids, lipids, carbohydrates, etc.) attached to the surface of the particle.

As used herein, the term "microparticle" refers to particles, groups of particles, particulate molecules (e.g. small individual groups of loosely associated groups of molecules), and groups of particulate molecules that while potentially varied in specific geometric shape have an effective, or average, diameter that can be measured on a microscale (e.g. measured in micrometers (µm) to hundreds of micrometers, generally less than 1 milimeter).

As used herein, the term "surface-modified inorganic microparticle" refers to a microparticle that includes surface groups (e.g. chemical substituents, proteins, nucleic acids, lipids, carbohydrates, etc.) attached to the surface of the particle.

As used herein, the term "monodisperse" refers to a sample containing particles wherein all of the particles contained are of substantially the same size (e.g. ±1%, ±2%, ±5%, ±10%, ±20%).

As used herein, the term "porosity" refers to a measure of the void spaces in a material (e.g. nanoparticle, microparticle, etc.). Porosity is expressed as a fraction of the volume of voids over the total volume, between 0-1, or as a percentage between 0-100%. "Macroporosity" refers to pores greater than 50 nm in diameter. "Mesoporosity" refers to pores greater than 2 nm and less than 50 nm in diameter. "Microporosity" refers to pores smaller than 2 nm in diameter.

DETAILED DESCRIPTION OF THE INVENTION

The present invention relates to compositions and methods for synthesis of organic-silica hybrid microparticles and nanoparticles. In particular, the present invention provides compositions and methods for particle size control during synthesis organic-silica hybrid microparticles and nanoparticles.

In some embodiments, the present invention provides bridged-polysilsesquioxane (e.g. aliphatic-bridged, aromatic-bridged, tertiary-amine-bridged, etc.) spherical monodisperse nanoparticles. In some embodiments, the present invention provides compositions and methods to prepare spherical, monodisperse nanoparticles of bridged polysilsesquioxanes. In some embodiments, particles are prepared by modified Stöber methods. In some embodiments, particle size is controlled (e.g. 20 nm to 1.5 µm) through incorporation of 1-PrOH (e.g. ~2 to ~20%) in the solvent. In some embodiments, particle size is controlled by modulation of monomer concentration (e.g. for the smallest and/or largest particles). In some embodiments, particles exhibit considerable surface area, both in external surface and internal pores. In some embodiments, particles of the present invention exhibit porosity without templating. In some embodiments, particles of the present invention exhibit buffering capacity. In some embodiments, compositions and methods of the present invention provide synthesis of spherical functional nano- and micro-sized hybrid materials with a range of chemical, physical and mechanical compositions. In some embodiments, compositions and methods of the present invention find use in selective adsorbent chromatography, drug delivery, bio- or chemo-labeling and sensing, and optoelectronics.

In some embodiments, the present invention provides compositions and method for the synthesis and/or growth of particles (e.g. nanoparticles, microparticles, etc.), and the particles produced by methods of the present invention. In some embodiments, particles of the present invention are spherical or substantially spherical. In some embodiments, particles of the present invention range in size from the low nanoscale (e.g. ~10 nm in diameter) to low microscale (e.g. ~5 μm in diameter). In some embodiments, compositions and methods of the present invention produce particles between 15 nm and 2 μm in diameter (e.g. diameter of 15 nm . . . 20 nm . . . 50 nm . . . 100 nm . . . 200 nm . . . 500 nm . . . 1 μm . . . 1.5 μm . . . 2 μm). In some embodiments, particles are approximately spherical or substantially spherical with approximate diameters or averaged diameters of between 20 nm and 1.5 μm.

In some embodiments, bridged polysilsesquioxanes are hybrid organic-inorganic materials based on molecular building blocks. In some embodiments, bridged polysilsesquioxanes are readily prepared by the sol-gel polymerization of monomers with two or more trialkoxysilyl groups attached to an organic bridging group (See, e.g. U.S. Pat. No. 5,371,154). In some embodiments, bridged polysilsesquioxanes of the present invention are of the general structure of Formula 1:

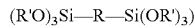

(R'O)$_3$Si—R—Si(OR')$_3$ wherein R' comprises any functional groups comprising carbon, hydrogen, nitrogen, oxygen, phosphorous, sulfur, and/or halogen atoms, including but not limited to alkyl, alkenyl, alynyl, phenyl, halo-substituents (e.g. fluoro, chloro, bromo, iodo), haloformyl, hydroxyl, carbonyl, aldehyde, carbonate ester, carboxylate carboxyl, ether, ester, hydroperoxy, peroxy, carboxamide, amine (e.g. tertiary), imine, imide, azide, azo, cyanates, isocynates, nitrate, nitrile, nitrite, nitro, nitroso, pyridine, phosphine, phosphodiester, phosphonic acid, phosphate, sulfide, sulfone, sulfonic acid, sulfoxide, thiol, thiocyanate, disulfide, and any combination or derivative thereof; and wherein R comprises any functional groups comprising carbon, hydrogen, nitrogen, oxygen, phosphorous, sulfur, and/or halogen atoms, including but not limited to alkyl, alkenyl, alynyl, phenyl, halo-substituents (e.g. fluoro, chloro, bromo, iodo), haloformyl, hydroxyl, carbonyl, aldehyde, carbonate ester, carboxylate carboxyl, ether, ester, hydroperoxy, peroxy, carboxamide, amine (e.g. tertiary), imine, imide, azide, azo, cyanates, isocynates, nitrate, nitrile, nitrite, nitro, nitroso, pyridine, phosphine, phosphodiester, phosphonic acid, phosphate, sulfide, sulfone, sulfonic acid, sulfoxide, thiol, thiocyanate, disulfide, and any combination or derivative thereof. In some embodiments, R and R' comprise the same chemical structure. In some embodiments, R and R' comprise different chemical structures.

In some embodiment, the bridging group (R) comprises an aromatic group (e.g. benzene, ethylbenzene, p-xylene, m-xylene, biphenyl, phenol, aniline, durene, heterocyclices (e.g. pyridine, imidazole, thiophene, etc.) polycyclics (e.g. naphthalene, phenathrene, etc.), substituted aromatics (e.g. trinitrotolunene, etc.), etc.). In some embodiments, the bridging group (R) comprises 1,4-diethylbenzene, as in the 1P nanoparticles described herein. In some embodiment, the bridging group (R) comprises an aliphatic group (e.g. straight chain, branched chain, non-aromatic ring, substituted, etc.). In some embodiments, the bridging group (R) comprises an alkane (e.g. methane, ethane, propane, butane, pentane, hexane, etc.). In some embodiments, the bridging group (R) comprises hexane, as in the 2P nanoparticles described herein. In some embodiment, the bridging group (R) comprises a tertiary amine (e.g. triethylamine, disopropylethylamine, dipropylmethylamine, diethylmethylamine, etc.). In some embodiments, the bridging group (R) comprises dipropylmethylamine, as in the 3P nanoparticles described herein.

In some embodiments, the present invention provides compositions and methods for preparation of monodisperse, spherical particles (e.g. nanoparticles, microparticles, etc.) comprising bridged polysilsesquioxanes. In some embodiments, particles are prepared from a solution and/or mixture of an alcohol, ammonia, and water; combined with a bridged silane monomer. In some embodiments, particles are prepared from a solution and/or mixture of an alcohol, ammonia (e.g. aqueous ammonia, aqueous ammonium hydroxide), and water. In some embodiments, suitable alcohols include, but are not limited to: methanol, ethanol, tert-butyl alcohol, isopropanol, 1-propanol pentanol, hexadecane-1-ol, etc. In some embodiments, particles are prepared using 1-propanol (1-PrOH). In some embodiments, a solution or mixture contains only trace amounts of water. In some embodiments, bridged silane monomers are added to an alcohol/ammonia/water solution and mixed (e.g. vigorously mixed) to form an emulsion and/or suspension. In some embodiments, bridged silane monomers are added to a pre-heated alcohol/ammonia/water solution and mixed (e.g. vigorously mixed) to form an emulsion and/or suspension. In some embodiments, the alcohol/ammonia/water solution is heated above room temperature (e.g. approximately 30° C., 35° C., 40° C., 45° C., 50° C., 55° C., 60° C., 65° C., 70° C., 75° C., 80° C., 85° C., 90° C., 95° C., etc.). In some embodiments, bridged silane monomers are vigorously mixed with an alcohol/ammonia/water solution, while being heated, until an emulsion and/or suspension is formed. In some embodiments, formation of the emulsion and/or suspension occurs concurrently with formation of the BPS from the silane monomers. In some embodiments, formation of the emulsion and/or suspension occurs concurrently with formation of BPS particles (e.g. monodisperse particles) from the silane monomers. In some embodiments, a suspension and/or emulsion of the alcohol/ammonia/water solution and the bridged silane monomers are allowed to cool to room temperature. In some embodiments, formation of the BPS from the silane monomers occurs concurrently with cooling of the emulsion and/or suspension. In some embodiments, formation of BPS particles (e.g. monodisperse particles) from the silane monomers occurs concurrently with cooling of the emulsion and/or suspension.

In some embodiments, compositions and methods of the present invention produce particles which exhibit some degree of porosity. In some embodiments, particles of the present invention exhibit significant porosity. In some embodiments, particles exhibit macroporosity, mesoporosity, and/or microporosity. In some embodiments, pores within a particle are of all or approximately the same diameter. In some embodiments, pores within a particle exhibit a range of sizes. In some embodiments, particles exhibit microporosity (e.g. significant microporosity). In some embodiments, particles exhibit pores with diameters less than, or about, 2 nm (e.g. 1 pm . . . 2 pm . . . 5 pm . . . 10 pm . . . 20 pm . . . 50 pm . . . 100 pm . . . 200 pm . . . 500 pm . . . 1 nm . . . 2 nm). In some embodiments, particles exhibit microporosity (e.g. significant microporosity), but not macroporosity and/or mesoporosity. In some embodiments, particles exhibit mesoporosity (e.g. significant mesoporosity). In some embodiments, particles exhibit pores with diameters between 2 nm and 50 nm (e.g. approximately 2 nm . . . approximately 5 nm . . . approximately 10 nm . . . approximately 20 nm . . . approximately 50 nm). In some embodiments, particles exhibit mesooporosity (e.g. significant mesoporosity), but not macroporosity and/or microporosity. In some embodiments, particles exhibit microporosity and mesoporosity, but not macroporosity. In some embodiments, particles exhibit pores with diameters ranging between 1 pm and 50 nm (e.g. approximately 1 pm . . . 2 pm . . . 5 pm . . . 10 pm . . . 20 pm . . . 50 pm . . . 100 pm . . . 200 pm . . . 500 pm . . . 1 nm . . . 2 nm 5 nm . . . 10 nm . . . 20 nm . . . 50 nm). In some embodiments, particles exhibit greater than 50% porosity (e.g. 51%, 75%, etc.). In some embodiments, particles exhibit greater than 25% porosity (e.g. 26% . . . 35% . . . 50% . . . 75%, etc.). In some embodiments, particles exhibit greater than 10% porosity (e.g. 11% . . . 20% . . . 30% . . . 40% . . . 50% . . . 60% . . . 70%, etc.). In some embodiments, particle porosity results in increased surface area, effective surface area, and/or surface to volume ratio. In some embodiments, increased surface area results in a greater surface for presentation of active groups, biologically active groups, functional groups, and or substituents to solution and/or interaction partners. In some embodiments, porosity provides an attractive topology for interaction with other molecules, macromolecule, particles, cells, surfaces, etc. In some embodiments, compositions and methods of the present invention provide control over the degree of porosity and/or the size of pores.

In some embodiments, the present invention provides compositions and methods for surface-modification of particles of the present invention. In some embodiments, substituents, functional groups, linkers, bioactive molecules, polymers, etc. are attached to the surface of particles of the present invention, e.g. to enhance to function, bioaccessibility, solubility, absorption, or other characteristics of the particles. In some embodiments, surface modification provides groups for biological interactions and/or interactions with other surfaces or materials. In some embodiments, the surface of a particle of the present invention is modified by the addition of a linker (e.g. PEG-linker, polymer linker), reactive group, protein (e.g. antigen, immunogenic protein, etc.), peptide (e.g. signal peptide), nucleic acid, or other useful molecule. In some embodiments, surface modification expands the variety of application for which particles of the present invention find utility, as will be understood by one of skill in the art.

EXPERIMENTAL

The following examples are provided in order to demonstrate and further illustrate certain preferred embodiments and aspects of the present invention and are not to be construed as limiting the scope thereof.

Example 1

Compositions and Methods

All monomers were purchased from Gelest, Inc. Ammonium hydroxide was purchased from Fisher Scientific. 1-Propanol was purchased from Aldrich. All were used as received unless otherwise specified.

To a 7 ml sample vial was added 1 M $NH_3$ as a mixture of 1.5 M $NH_{3(aq)}$, $H_2O$ and 1-PrOH (2.7 mL total, Table 6). The solution was pre-heated to the reaction temperature (60° C., unless otherwise specified). To the solution was added 2.8 mmol of bridged silane monomer. The biphasic mixture was stirred vigorously until no monomer oil phase could be detected. The resulting suspension was allowed to cool to room temperature, aged overnight then dialyzed against water (3 L) in regenerated cellulose tubing (12-14K cut off) for 24 h (the water was changed at 6 h). Dialyzed suspensions were kept under ambient temperature. For yield calculation and evaluation of dry particle properties, suspensions were dialyzed against MeOH (300 mL) in regenerated cellulose tubing (12-14K cut off) for 24 h (the MeOH was changed at 3 and 6 h), dried by rotavap then under hi-vacuum.

TABLE 6

Amount of 1.5M $NH_{3(aq)}$, 1-PrOH and $H_2O$ used in particle synthesis.
Synthesis of bridged polysesquioxane nanoparticles: Solvent composition.

| 1-PrOH conc. | 1.5M $NH_{3(aq)}$(mL) | 1-PrOH (mL) | $H_2O$ (mL) |
|---|---|---|---|
| 0% | 1.800 | 0.000 | 0.900 |
| 2% | 1.800 | 0.054 | 0.846 |
| 4% | 1.800 | 0.108 | 0.792 |
| 5% | 1.800 | 0.135 | 0.765 |
| 6% | 1.800 | 0.162 | 0.738 |
| 8% | 1.800 | 0.216 | 0.684 |
| 10% | 1.800 | 0.270 | 0.630 |
| 12% | 1.800 | 0.324 | 0.576 |
| 14% | 1.800 | 0.378 | 0.522 |
| 15% | 1.800 | 0.405 | 0.495 |
| 16% | 1.800 | 0.432 | 0.468 |
| 18% | 1.800 | 0.486 | 0.414 |
| 20% | 1.800 | 0.540 | 0.360 |
| 22% | 1.800 | 0.594 | 0.306 |
| 24% | 1.800 | 0.648 | 0.252 |

Scanning electron microscopy (SEM) was performed on a Zeiss Ultra 55 CDS field-emission scanning electron microscope; Nanoparticles for SEM were drop coated onto silicon wafers from diluted and sonicated water suspensions and dried overnight under ambient conditions. Typical accelerating voltages used were 3 to 5 kV. Dynamic light scattering (DLS) and zeta potential measurements were carried out on a Malvern Zetasizer Nano ZS dynamic light scattering particle size analyzer. Nanoparticles suspensions for DLS and zeta potential measurements were diluted and sonicated for 30 minutes before measurement; particles with average diameters under 100 nm were filtered through PVDF syringe filters (pore size 200 nm, purchased from Nalge Nunc Int.). Nitrogen adsorption was measured on a Quantachrome Autosorb-1. The resulting isotherms were converted to surface area and pore size distribution profile with multipoint BET and QSDFT adsorption model fitting respectively.

All solid state NMR experiments were carried out on a Bruker 300 DSX NMR spectrometer equipped with a 7-mm double-resonance magic-angle-spinning (MAS) probe head. Single-pulse $^{29}Si$ MAS experiments were accumulated with 300-600 free induction decays (FIDs) with the $\pi/3$ pulse of 6 µs and the repetition time of 180 s. In the case of cross-polarization (CP) experiments, the radiofrequency (rf) strength for $^1H$ was 25 kHz while the Hartmann-Hahn match condition for $^{29}Si$ was optimized based on the signal of sodium 3-(trimethylsilyl)-1-propanesulfonate hydrate. The CP contact time was 2 ms.

Example 2

Preliminary Particle Synthesis 1,4-bis(triethoxysilyl)benzene (0.1M, calculated as if it were fully dissolved) was added to 1.0 M aqueous ammonia at 60° C. under vigorous stirring, the monomer oil droplets were not completely consumed even after 3 days. The water phase was opalescent, indicating the presence of colloids. SEM images taken following drying a drop of the water phase on a Si wafer, revealed particles with an average diameter of ~25 nm. Prolonged exposure to the electron beam resulted in particle degradation, suggesting a very low degree of condensation. Changing the monomer to 1,8-bis(triethoxysilyl)octane gave a similar result. 1,2-Bis(triethoxysilyl)ethane was used to test whether its higher water solubility facilitates the reaction. However, using the above conditions, no particles were observed under SEM from the dried homogenous reaction mixture after ~2 h of reaction. The reaction mixture turned into a transparent bulk gel after several days (Table 1).

Partially hydrolyzed trimethoxysilyl species have greater water solubility and the hydrolysis rate of trimethoxysilyl group is several orders of magnitude faster than the triethoxysilyl group. [13] An attempt using bis(trimethoxysilylethyl) benzene (1, ~85% para isomer) under the above conditions, resulted in full consumption of monomer droplets and formation of nanoparticles (44±5 nm); the NPs formed were stable under e-beam in SEM observation.

Example 3

Particle Synthesis

Reports of the "Stöber-like" process for organic modified silica particles emphasize monomer concentration as a key to nanoparticle size control (13). However, when the concentration of 1 was increased from 0.1 M to 0.2 M, particle size did not change significantly (43±5 nm). One important observation however, was that the "oil droplets" of monomer 1 were not consumed until ~1.5 h after the reaction was initiated. A water-organic solvent mixture was employed to determine whether the "effective concentration" of monomer in the water phase is limited not only by the rate of hydrolysis but by the intrinsic solubility of the monomer. The solubility of monomers was adjusted by altering the percentage of organic solvent and keeping the ammonia concentration at 1M. 1-Propanol was chosen as the organic solvent. The modified conditions resulted in formation of spherical uniform particles. Furthermore, particle size (measured by dynamic light scattering (DLS) and scanning electron microscopy (SEM)) could be controlled by the alcohol content (SEE FIG. 1A). SEM analysis shows 1P particles produced with 0-12% 1-PrOH are monodisperse (~11% relative standard deviation of diameter). The size uniformity was slightly less as the 1-PrOH percentage increased from 14 to 18% (15-25% RSD). Particles are again highly monodisperse with 20% 1-PrOH (11% RSD). A further increase of the 1-PrOH percentage (22-24%) results in some loss of monodispersity due to the emergence of smaller particles.

Hexyl-bridged monomer 2 and tertiary amine bridged monomer 3 were included to test the generality of the method.

TABLE 1

Summary of modified Stöber methods for preparing BPS nanoparticles.

| Entry | R | R' | Results |
|---|---|---|---|
| 1 | (p-phenylene) | Et | Low extent of reaction |
| 2 | (octylene chain) | Et | Low extent of reaction |
| 3 | (branched alkyl) | Et | Bulk gelation |
| 4 | (bis-ethyl-p-phenylene) | Me | NP formed (1P, 44 ± 5 nm) |

Although the present invention is not limited to any particular mechanism of action and an understanding of the mechanism of action is not necessary to practice the present invention, this observation indicates the higher monomer reactivity and resulting increased reactive soluble monomer concentration contributed by trimethoxysilyl groups is important for synthesizing spherical particles of bridged polysilsesquioxanes. Further experiments conducted during development of embodiments, of the present invention build upon and expand on this finding with monomers with two trimethoxysilyl groups.

The positive correlation among 1-PrOH content, effective monomer concentration and resulting particle size was supported in these experiments.

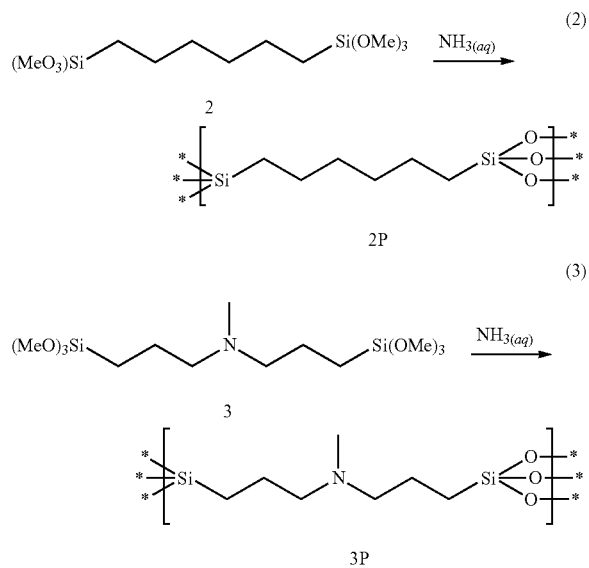

Figure 2:
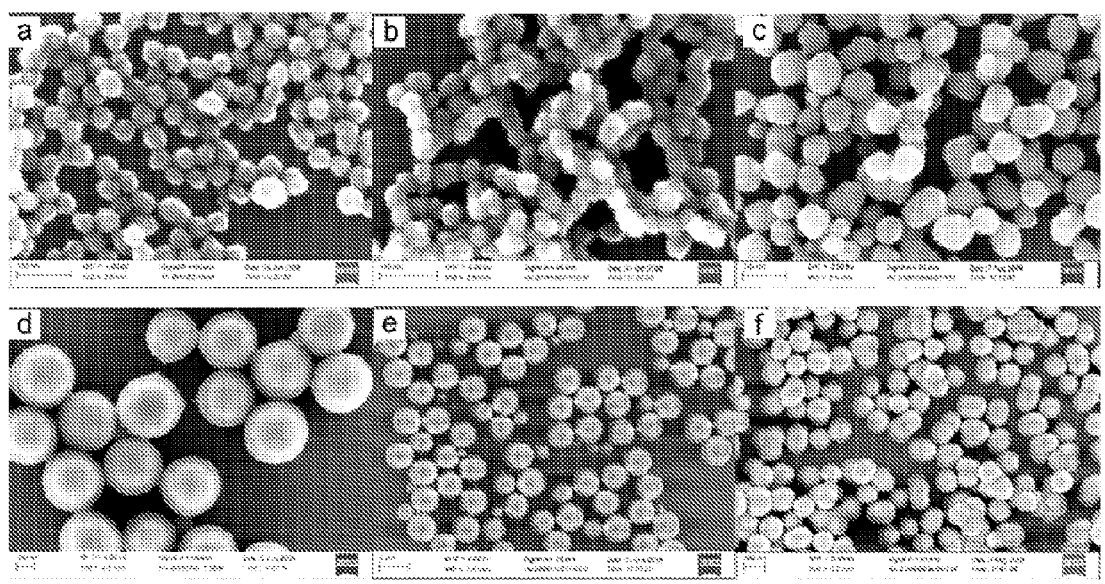
FIG. 2 shows images of representative BPS NPs (a) 1P (b) 2P (c) 3P synthesized in aqueous ammonia solution (0% 1-PrOH), and "large" BPS NPs (d) 1P (e) 2P (f) 3P synthesized in ammonia solution with (d) 20% (e) 18% (f) 14% 1-PrOH.
Figure 3:
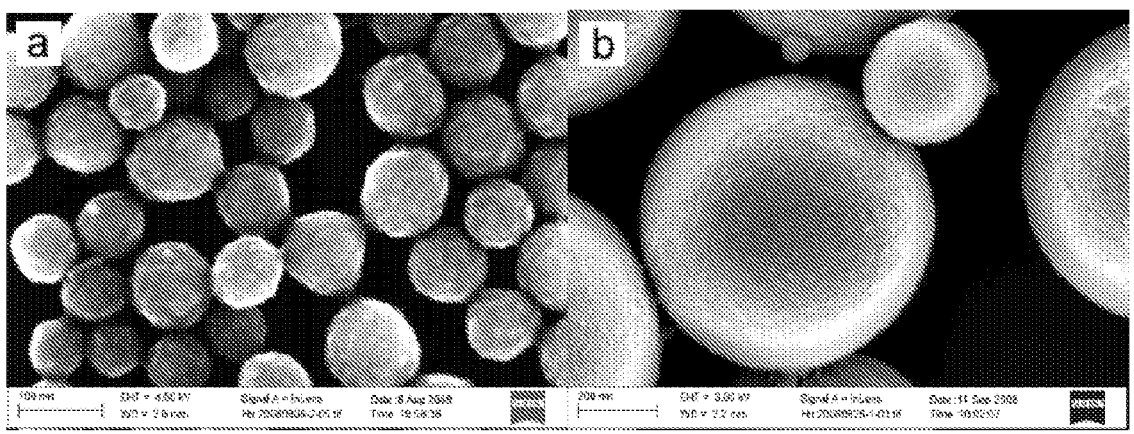
FIG. 3 shows images of 1P nanoparticles. (a) 70 nm; (b) 800 nm.

In pure aqueous ammonia 2P nanoparticles were less spherical with some fused clusters compared to 1P nanoparticles (SEE FIG. 2B). Increasing the 1-PrOH content from 0% to 10% resulted in not only larger particles, but also with a greater incidence of spherical rather than fused particles. Approximately 80 nm 3P particles were formed in aqueous 1M $NH_3$; increasing 1-PrOH concentration from 0% to 14% gradually increased particle diameters up to ~400 nm. Particle size did not change significantly with further increase of 1-PrOH concentration (SEE FIG. 1C).

For nanoparticles >70 nm in diameter, the difference of particle sizes determined by DLS and SEM are generally small. Thus, there is little shrinkage of particles as a result of drying, indicating that the particles, as formed, are highly condensed. This is in contrast to bulk BPS gels with similar chemical compositions which undergo substantial shrinkage (~80%) upon drying to a xerogel.

Example 4

Particle Growth

As the 1-PrOH content increases, larger BPS particles are formed. Particles can be synthesized with up to 20-fold size difference, by adjusting the 1-PrOH content. The time needed for full consumption of monomer droplets and the appearance of turbidity decreases with increasing 1-PrOH percentage. Generally, at 60° C., monomer 1 takes less than 20 minutes in 10% 1-PrOH and less than 3 minutes in 20% 1-PrOH to be fully consumed. The increase of monomer dissolution can be correlated with the increase of resulting particle sizes.

Figure 4:
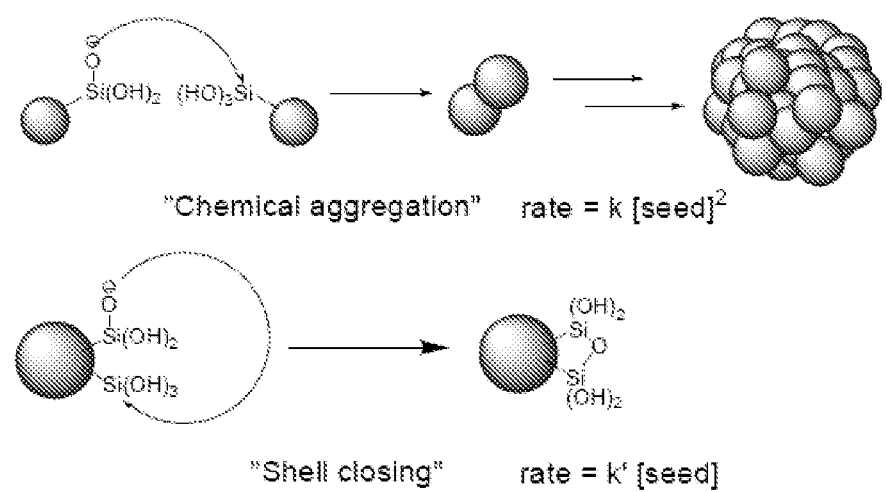
FIG. 4 shows an illustration of competitive mechanisms for particle growth and size limitation.

Although the present invention is not limited to any particular mechanism of action and an understanding of the mechanism of action is not necessary to practice the present invention, models used to discuss the growth of silica particles under Stöber conditions provide explanation for this result. There are two well-accepted particle growth models for the process: "monomer addition" and "controlled aggregation." The condensation of partially hydrolyzed soluble monomers results in nucleation. In the first model, the particle grows only by addition of hydrolyzed monomers to surface Si—O⁻ groups; in the latter model, once the particles have reached a certain size, it grows only by aggregation. In the SEM images, the spheres appear to be composed of smaller nanoparticles with diameters approximately 5-10 nm (SEE FIG. 4) indicating that the "controlled aggregation" model is important for the growth of BPS nanoparticles. As the monomer solubility increases with a higher concentration of 1-PrOH, the number of particle "seeds" or nucleation sites in the water phase is expected to increase. If the "monomer addition" mechanism were dominating, the final particle size would be smaller in this case, due to the larger number of nucleation sites. The model of "controlled aggregation" explains the experimental trend better: if a large number of nucleation sites are produced in a short time in a solution rich in 1-PrOH, they have greater probability to chemically aggregate with each other before surface silanol groups condense with adjacent ones (SEE FIG. 4). Larger particles result from solutions rich in 1-PrOH. It is noted that SEM images of particles have smoother surfaces than a pure aggregate of small spheres, indicating that the "monomer addition" mechanism, which is believed to contribute to smoothing the particle surface, may still play a role in the particle growth.

Figure 5:
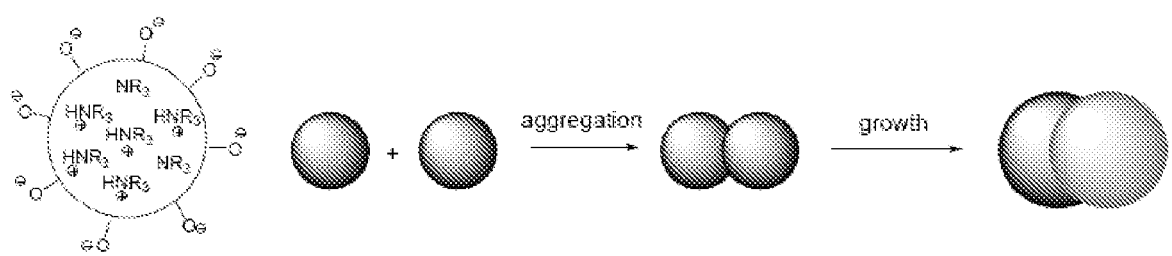
FIG. 5 shows a schematic explanation of morphology of particle 3P.
Figure 9:
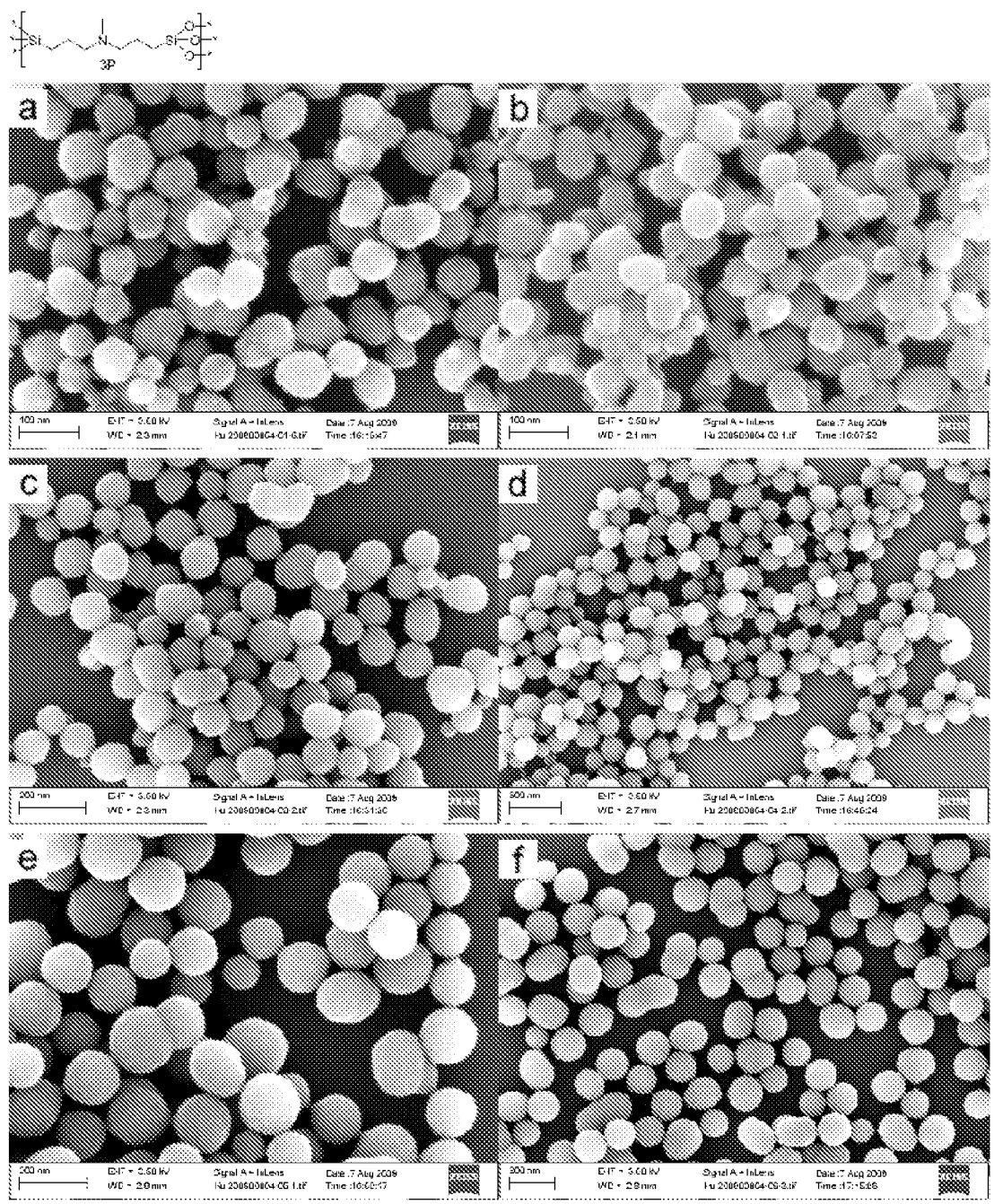
FIG. 9 shows SEM images of BPS nanoparticles 3P synthesized with different ratios of 1-PrOH in water: (a) 0%; (b) 2%; (c) 4%; (d) 6%; (e) 8%; (f) 10%; (g) 12%; (h) 14%; (i) 16%; (j) 18%; (k) 20%.
Figure 9:
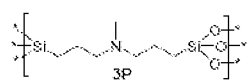
Figure 9:
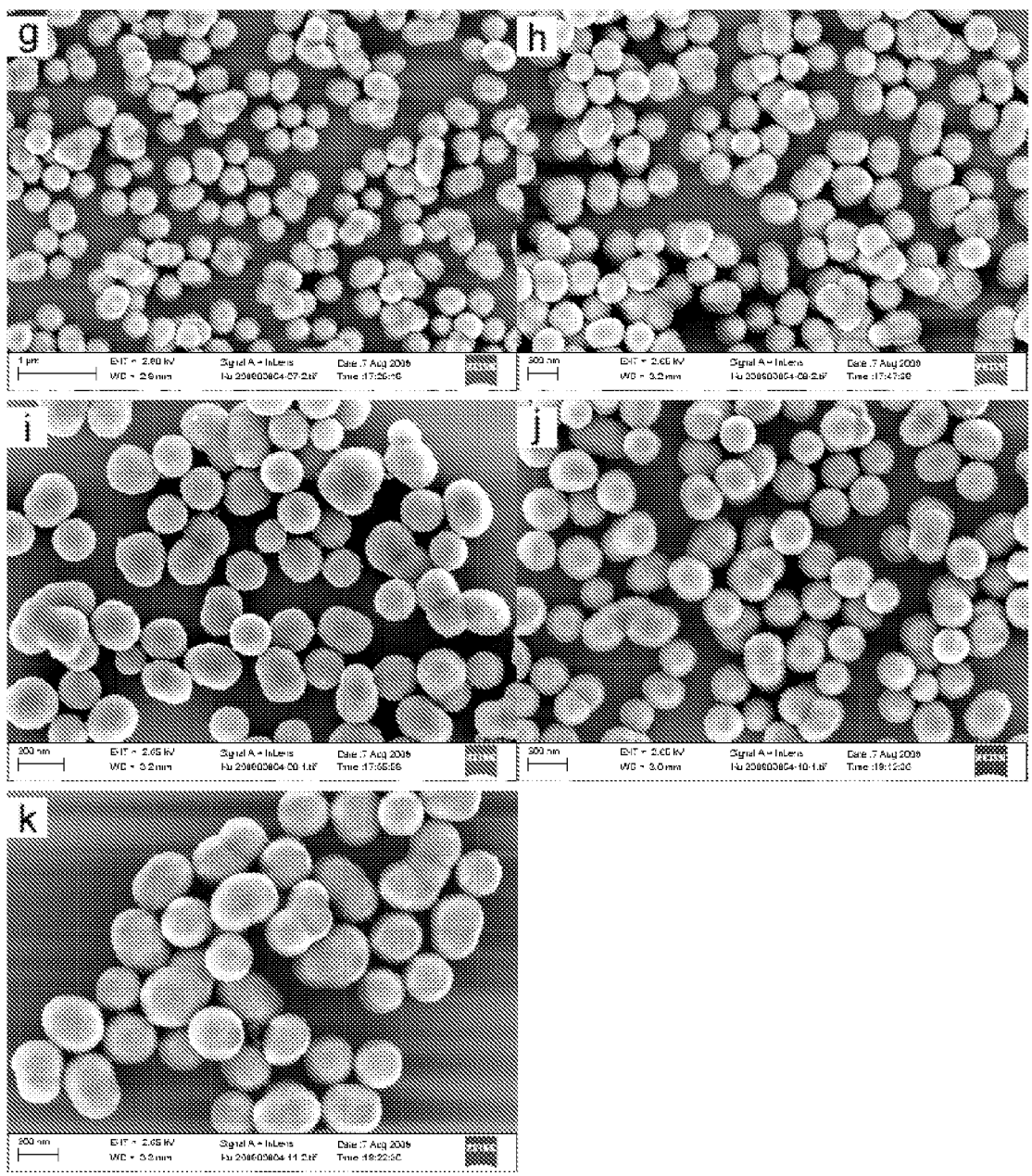
Figure 10:
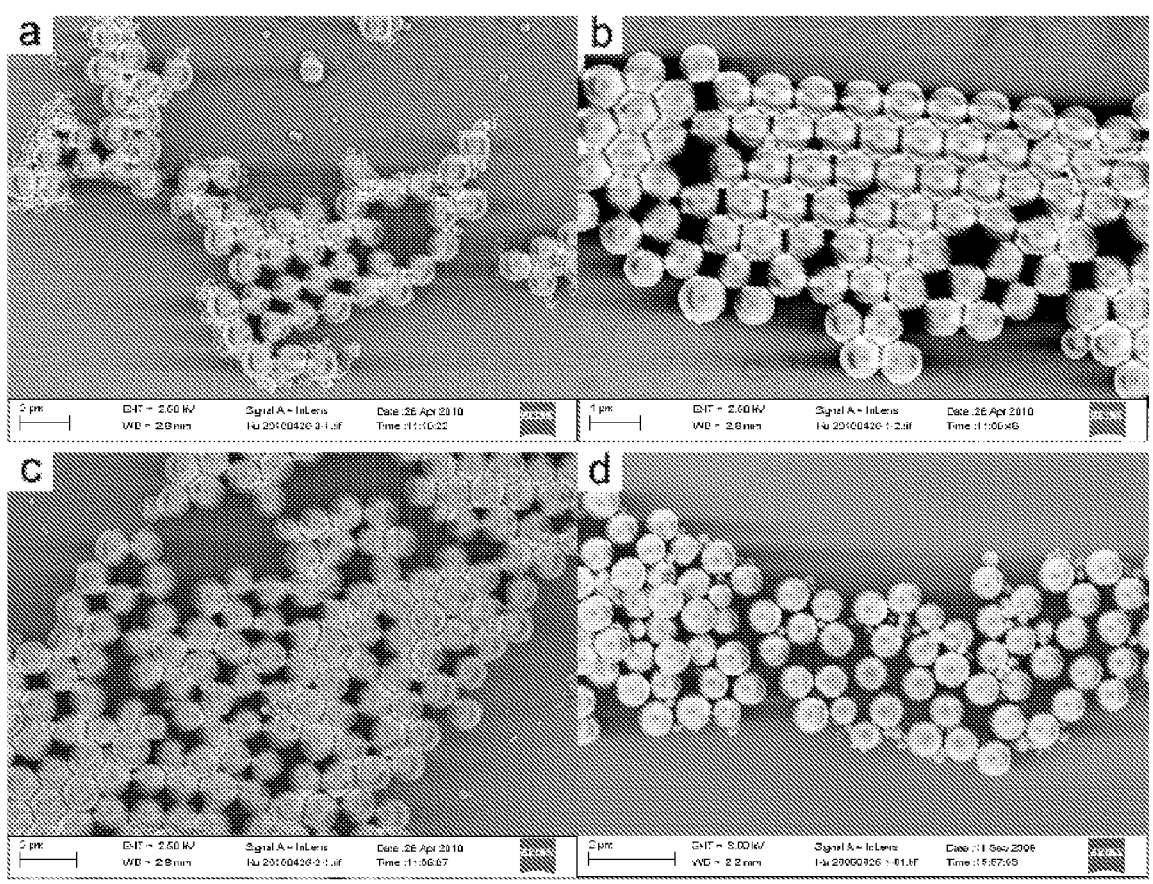
FIG. 10 shows SEM images of BPS particles 1P synthesized with 20% 1-PrOH and monomer concentration: (a) 0.120 M; (b) 0.135M (c) 0.15M (d) 0.2M.
Figure 11:
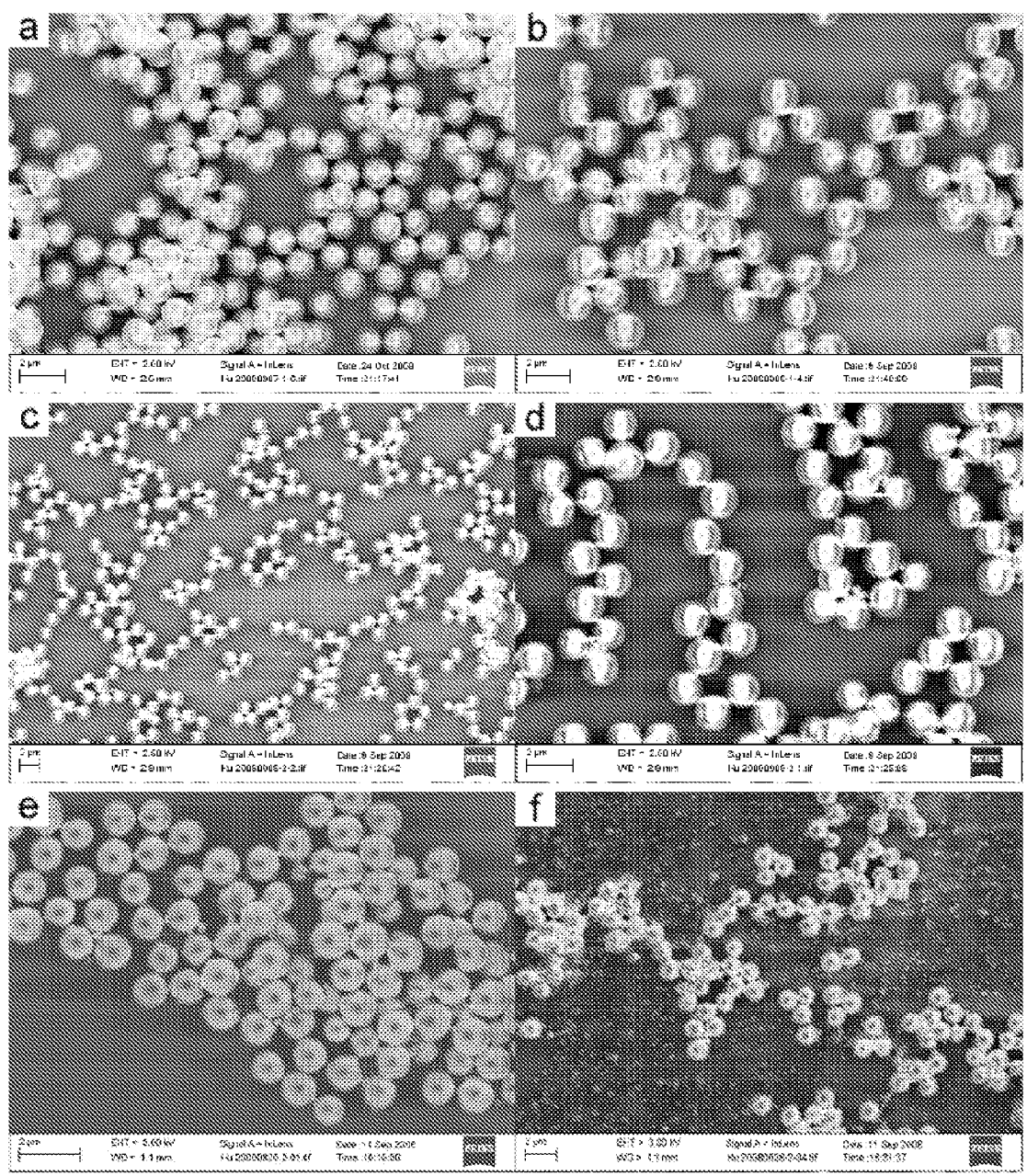
FIG. 11 shows SEM images of BPS particles 1P synthesized with 22% 1-PrOH and monomer concentration: (a) 0.120 M; (b) 0.135M (c)(d) 0.15M (e)(f) 0.2M.
Figure 12:
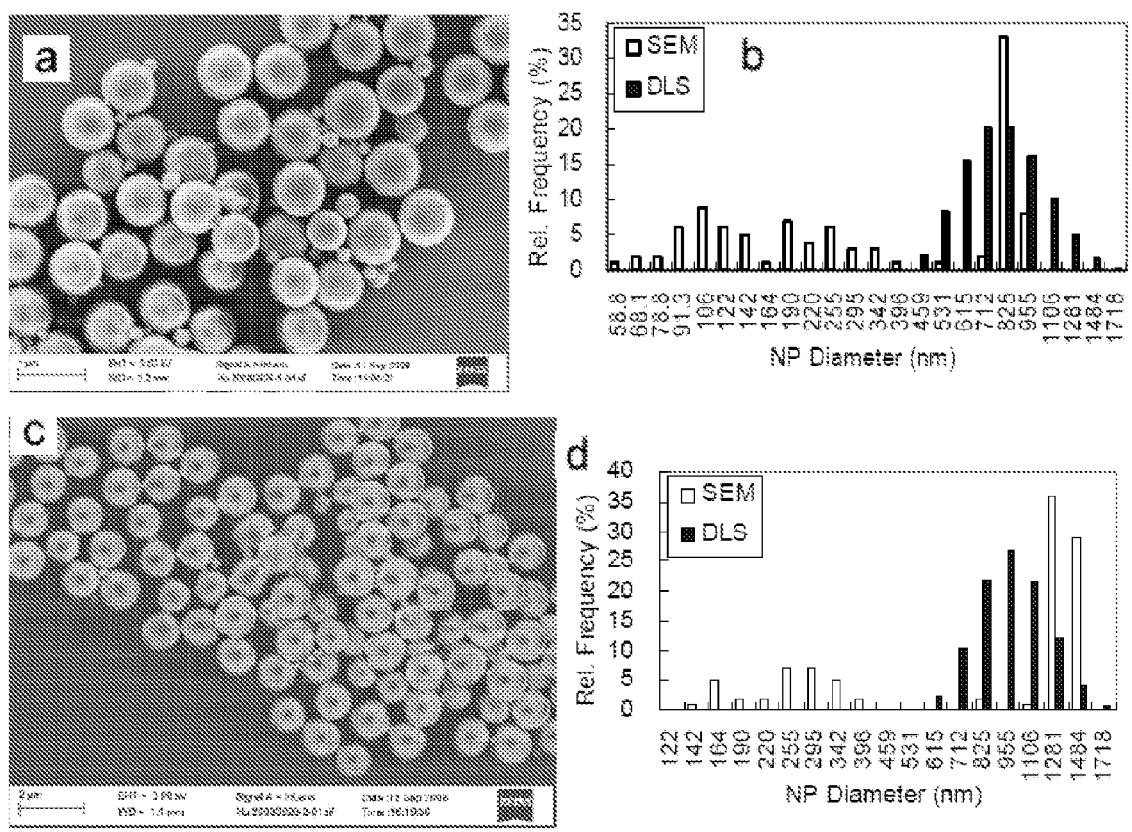
FIG. 12 shows (a, c) SEM images and (b, d) particle size distribution profile of 1P particles prepared in 20% (a, b) and 22% (c, d) 1-PrOH. ((monomer 1)=0.2M).
Figure 13:
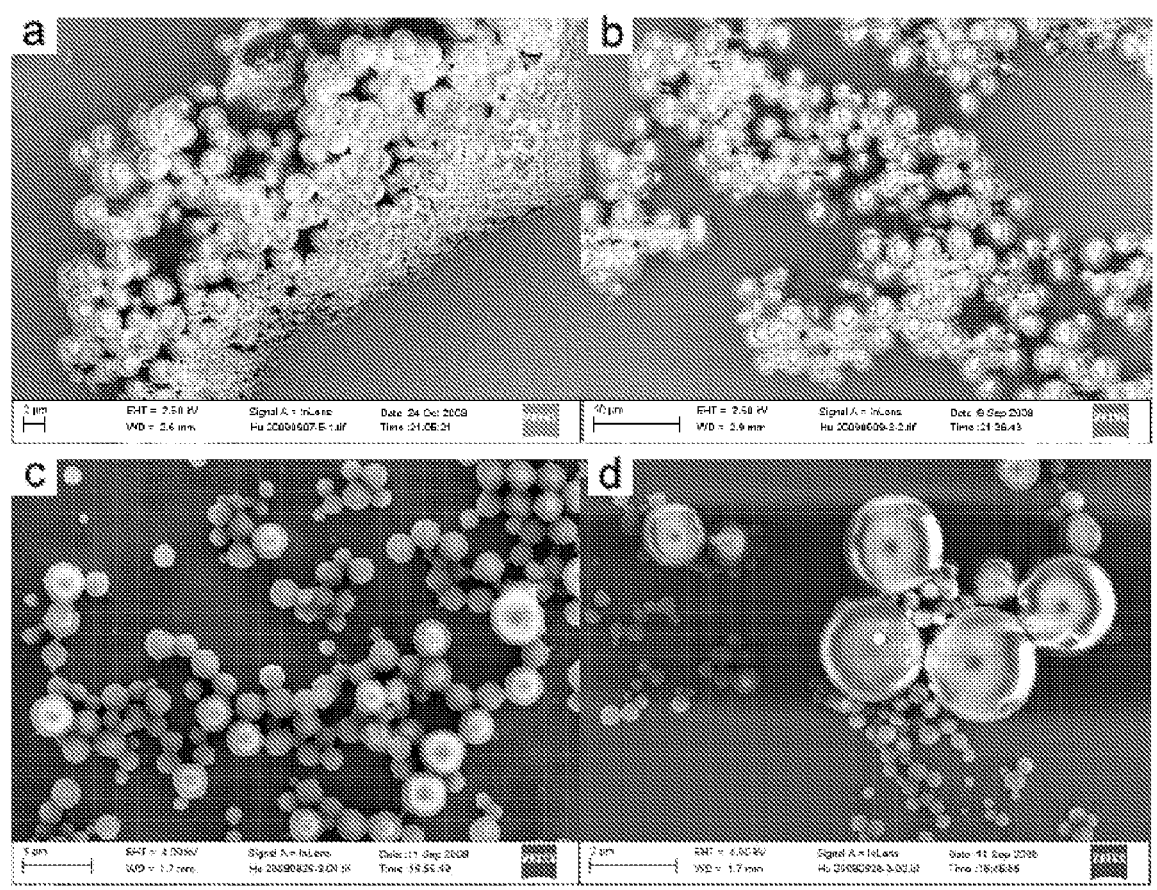
FIG. 13 shows SEM images of BPS particles 1P synthesized with 24% 1-PrOH and monomer concentration: (a) 0.12 M; (b) 0.15M (c)(d) 0.2M.
Figure 14:
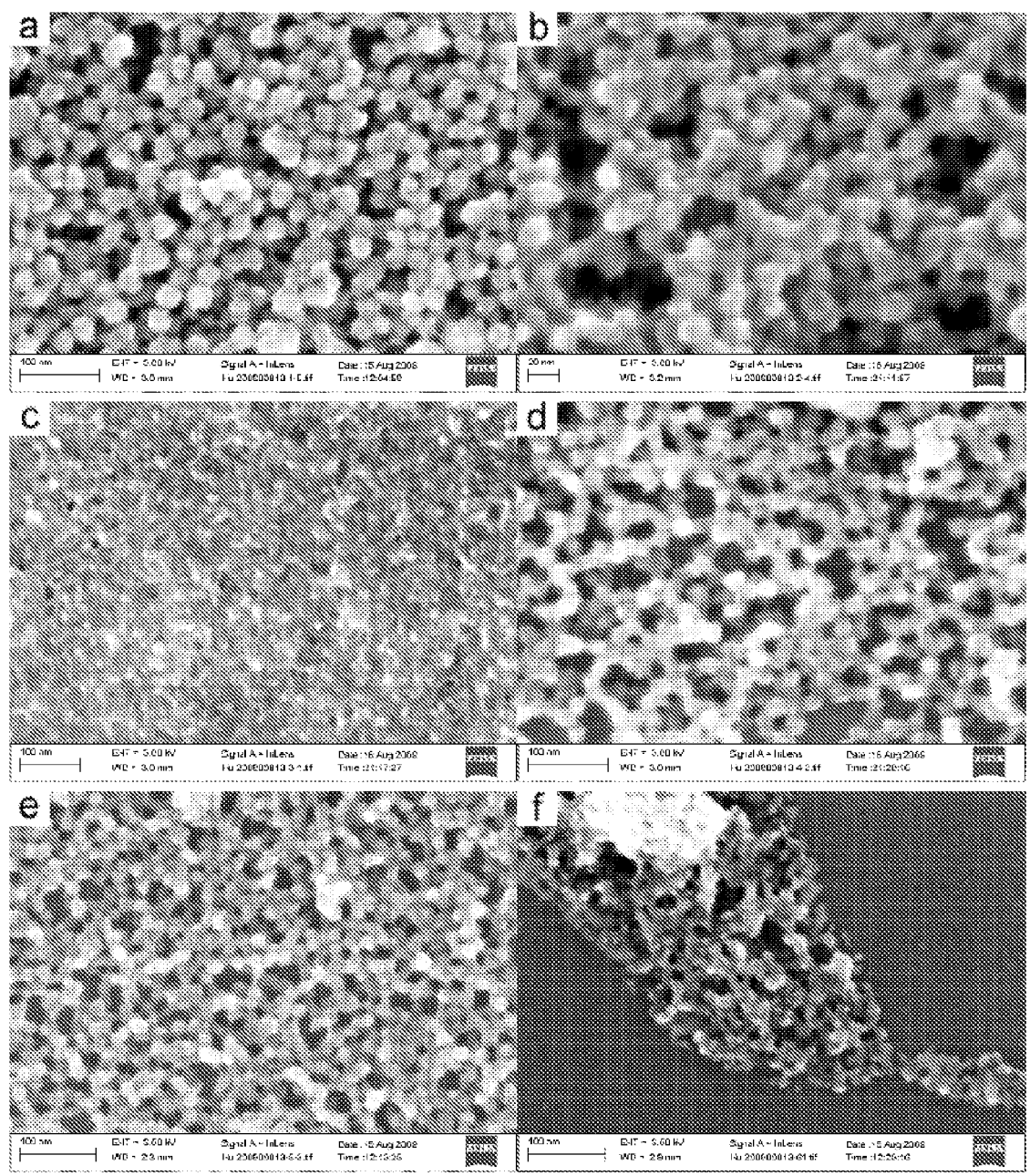
FIG. 14 shows SEM images of BPS particles synthesized with 0% 1-PrOH and monomer concentration under 0.1M. The correlation among monomer, concentration and image numbering is shown in the table. The limited resemblance to discrete spheres in some smallest NP examples is due to limitations in SEM resolution and NP surface stability.
Figure 14:
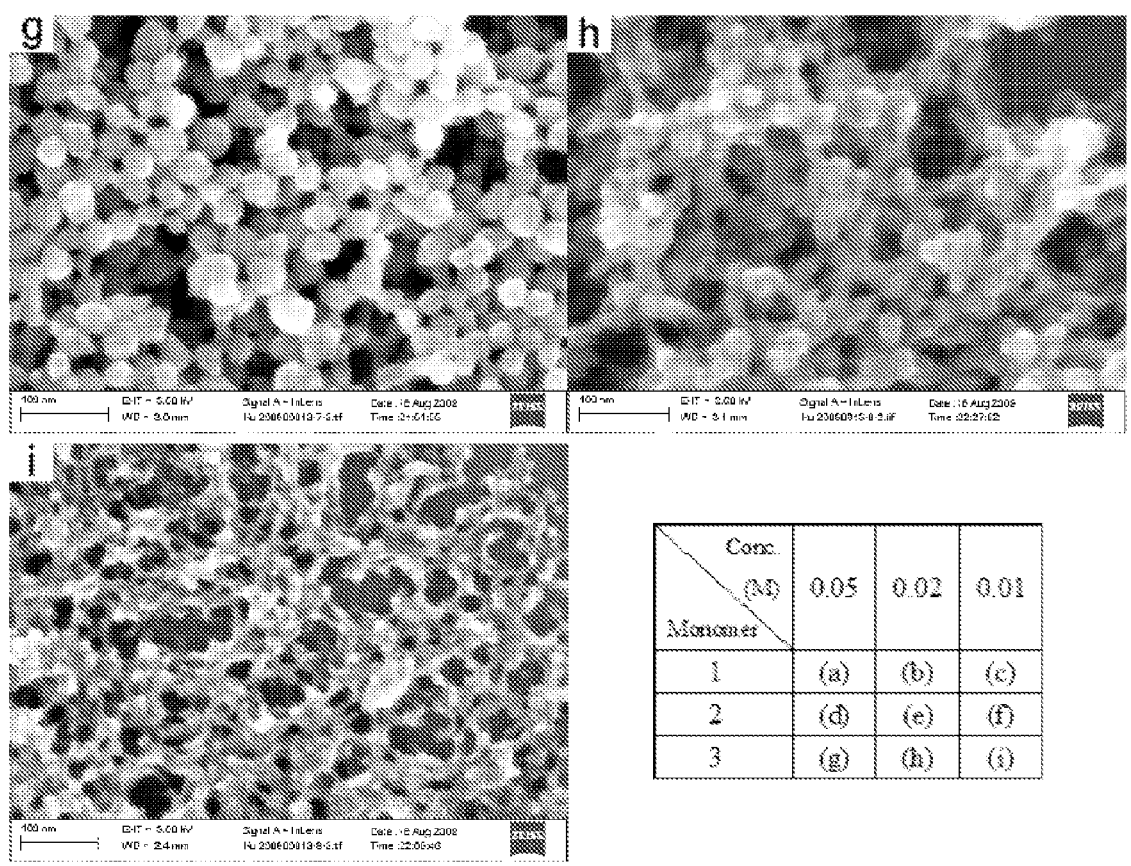
Figure 15A:
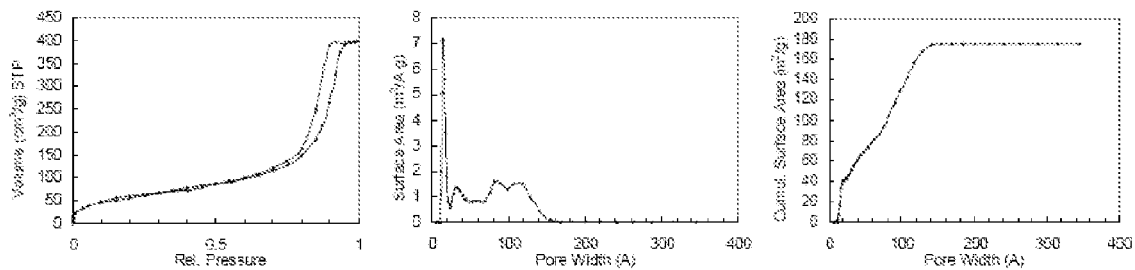
FIGS. 15A and 15B show nitrogen adsorption isotherm (left) and pore size distribution (middle: differential; right: cumulative) of BPS nanoparticles.
Figure 15A:
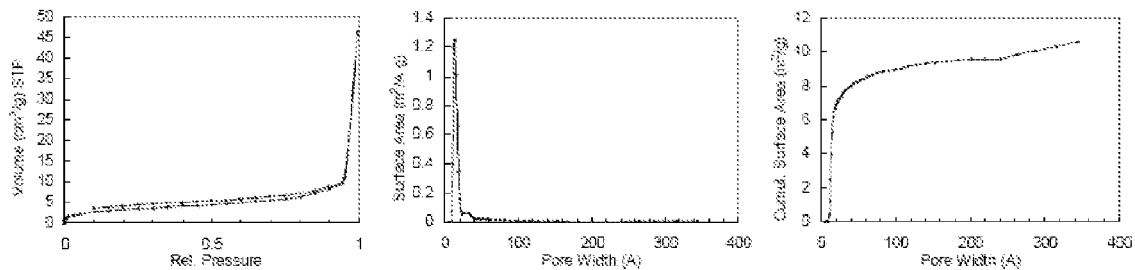
Figure 15A:
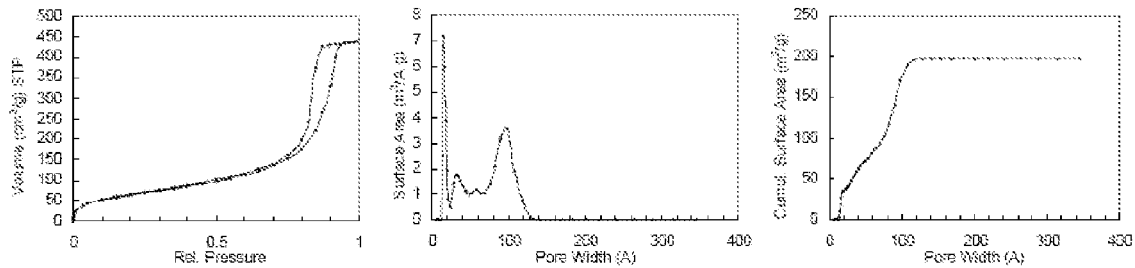
Figure 15A:
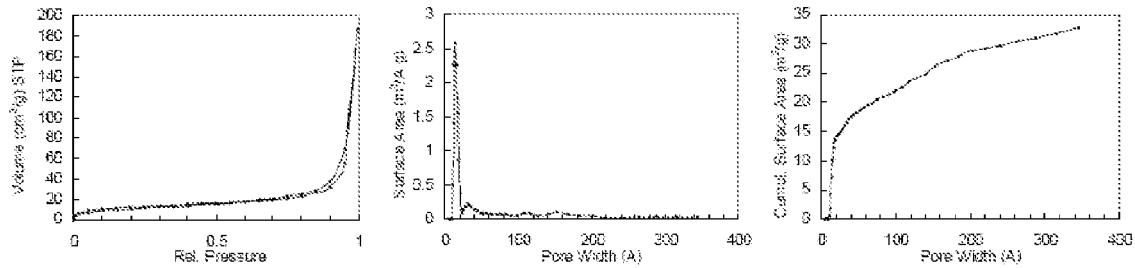
Figure 15B:
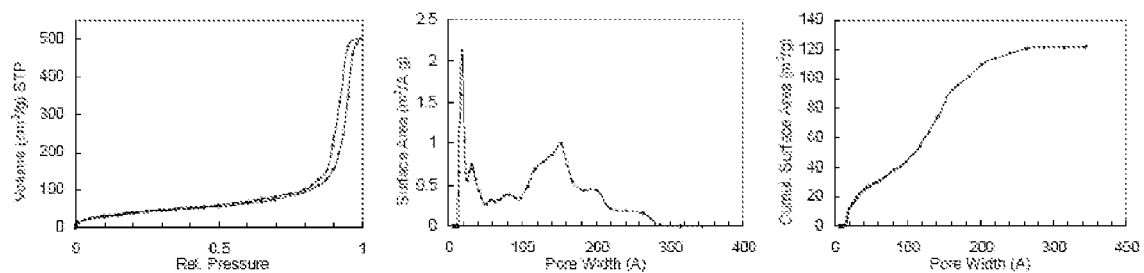
Figure 15B:
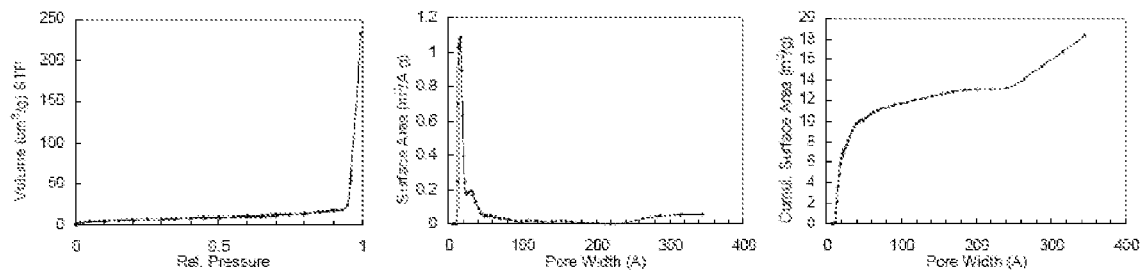

The growth of particles from monomer 3 is particularly interesting since the organic fragment, a tertiary amine, can bear a positive charge that can influence particle stability and the growth process. Some of the 3P nanoparticles appear to be comprised some "twinned" particles (SEE FIGS. 2C, 2F, and 9). The zeta potential of diluted reaction solutions of 3P particles is approximately −20 to −30 mV (Table 2). Colloidal particles with zeta potentials in this region typically have marginal colloidal stability. In contrast, hydrocarbon bridged 1P and 2P particles exhibit zeta potentials (−45 to −50 mV) sufficient to support stable colloidal suspensions. Thus, 3P particles have a stronger tendency than those with neutral bridging groups, to aggregate at all stages of the growth process; the growth can continue on the aggregated particles, leading in some cases to their "twinned" appearance. (SEE FIG. 5)

TABLE 2

Zeta potential of 3P nanoparticles tuned by different acid-base conditions.

| Treatment of rxn mixture | pH | ζ potential (mV) |
|---|---|---|
| Diluted w/ 1M $NH_3$ | 11.1 | −32 ± 6 |
| Diluted w/ $H_2O$ | 10.3 | −19 ± 5 |
| Dialyzed w/ $H_2O$ | 8.9 | +23 ± 7 |
| Dialyzed w/ $H_2O$, then added HCl | 7.4[a] | +48 ± 5[a] |
| (3 mol % of monomer)[a] | | |
| (30 mol % of monomer)[b] | 6.5[b] | +49 ± 6[b] |

The chemical composition of NP 3P can help explain its suggested mechanism of formation and the medium effect on its zeta potential. Tertiary amines have $K_b$ values almost one order of magnitude lower than ammonia, thus they are partially protonated even in ammonia solution. Under dilute basic conditions, the core exhibits positive charge that partially compensates the negative charge of deprotonated surface silanols. This can account for their less negative zeta potential. The positive charge in the core is dominant after dialysis against water. Buffering capacity is observed upon acidification (Table 2), a behavior similar to poly(ethylene imine) functionalized nanoparticles. The buffering effect promotes endosomal escape of NPs, enhancing their drug and DNA delivery efficiency toward cells. This buffering capacity is an intrinsic property of 3P nanoparticles, while still retaining the ability for surface modification and labeling, therefore, 3P particles are contemplated as drug and DNA carriers. In certain embodiments, the present invention provides 3P operatively linked to a therapeutic drug or nucleic acid sequence.

Increasing the concentration of monomer 1 did not result in the significantly different particle size at 18% or lower 1-PrOH content. At 22% 1-PrOH, increasing the concentration of monomer 1 up to 0.15 M resulted in monodisperse particles up to 1.5 □m. Further increase of (monomer 1) and (1-PrOH) resulted in bimodal particle size distribution and polydisperse microparticles respectively (Table 3; FIGS. 10-13).

TABLE 3

Size of 1P particles (in μm) as a function of [1-PrOH] and [monomer 1]. Small[a] or considerable[b] fractions of smaller particles (100-300 nm) were detected.

| | [1-PrOH] | | |
|---|---|---|---|
| [monomer 1] | 20% | 22% | 24% |
| 0.12M | 0.83 | 1.1 | 0.5-4 |
| 0.135M | 1.2[a] | 1.3 | 0.5-4 |
| 0.15M | 1.2[b] | 1.5 | 0.5-4 |
| 0.20M | 0.81[b] | 1.2[b] | 0.2-3 |

To further establish the relationship between particle size and monomer concentration, BPS NPs were synthesized in 1M aqueous $NH_3$ but at lower monomer concentrations (0.05M, 0.02M and 0.01M). The results show that the strategy can be successfully applied to prepare particles as small as ~20 nm.

Figure 6:
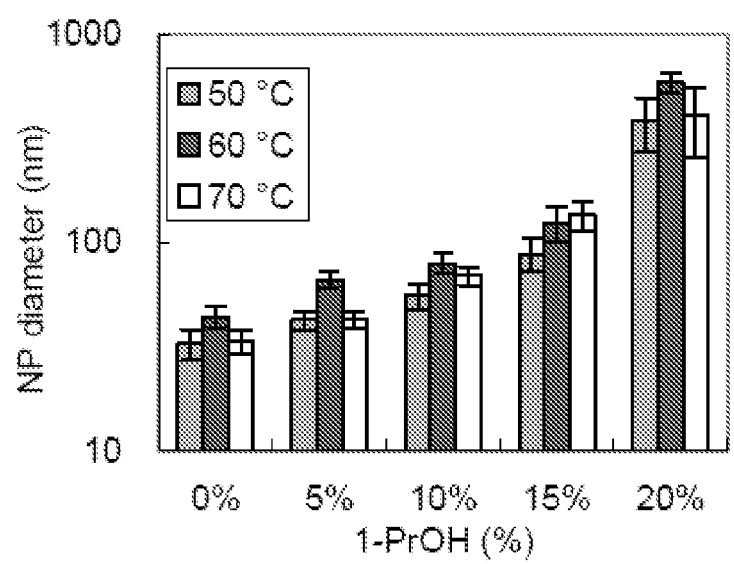
FIG. 6 shows a graph camparing 1P particle size (determined by SEM) as a function of temperature and 1-propanol content.
Figure 7:
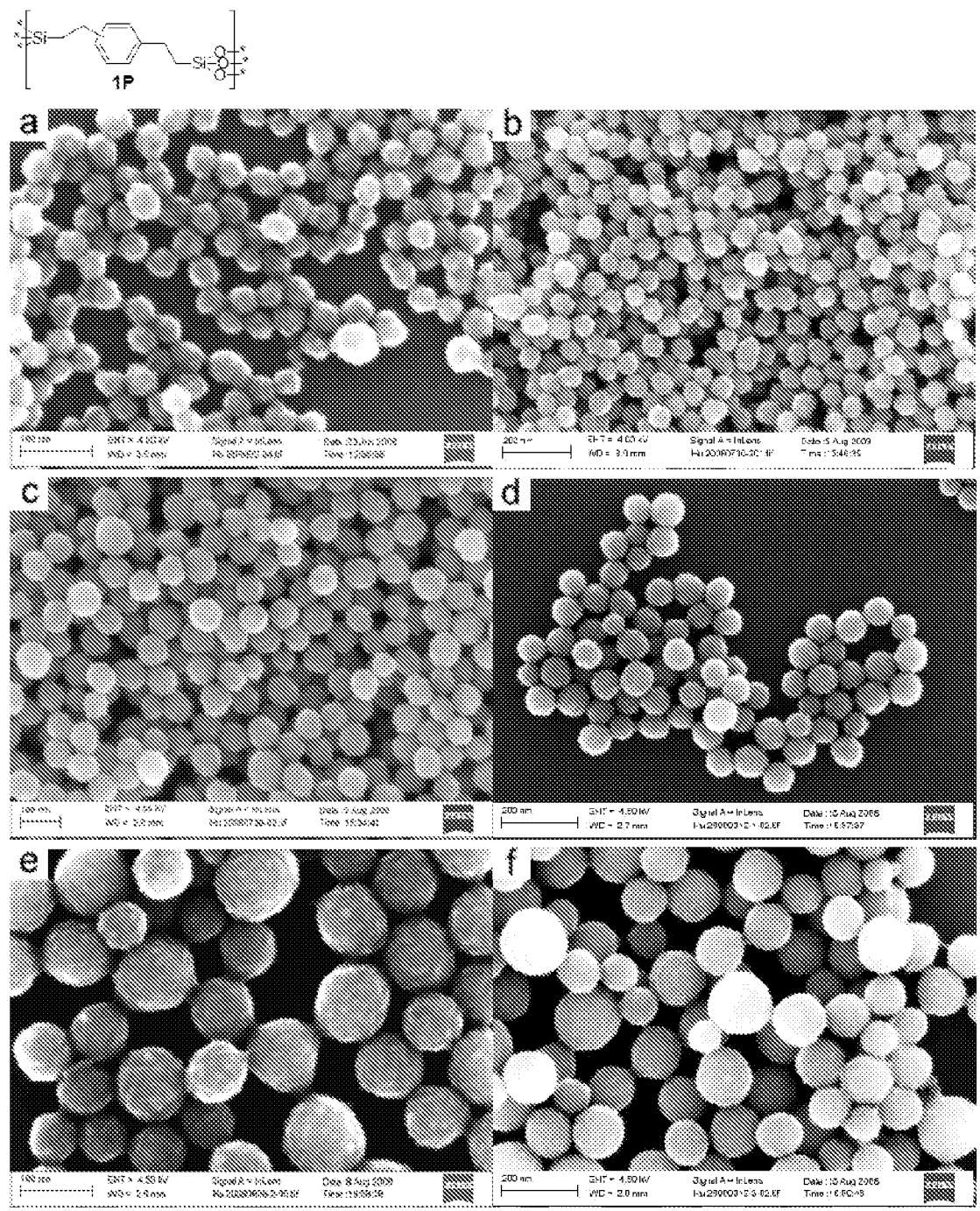
FIG. 7 shows SEM images of BPS nanoparticles 1P synthesized with different ratios of 1-PrOH in water: (a) 0%; (b) 5%; (c) 10%; (d) 12%; (e) 14%; (f) 16%; (g) 18%; (h) 20%; (i) 22%; (j) 24%.
Figure 7:
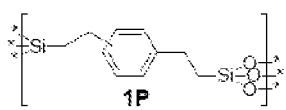
Figure 7:
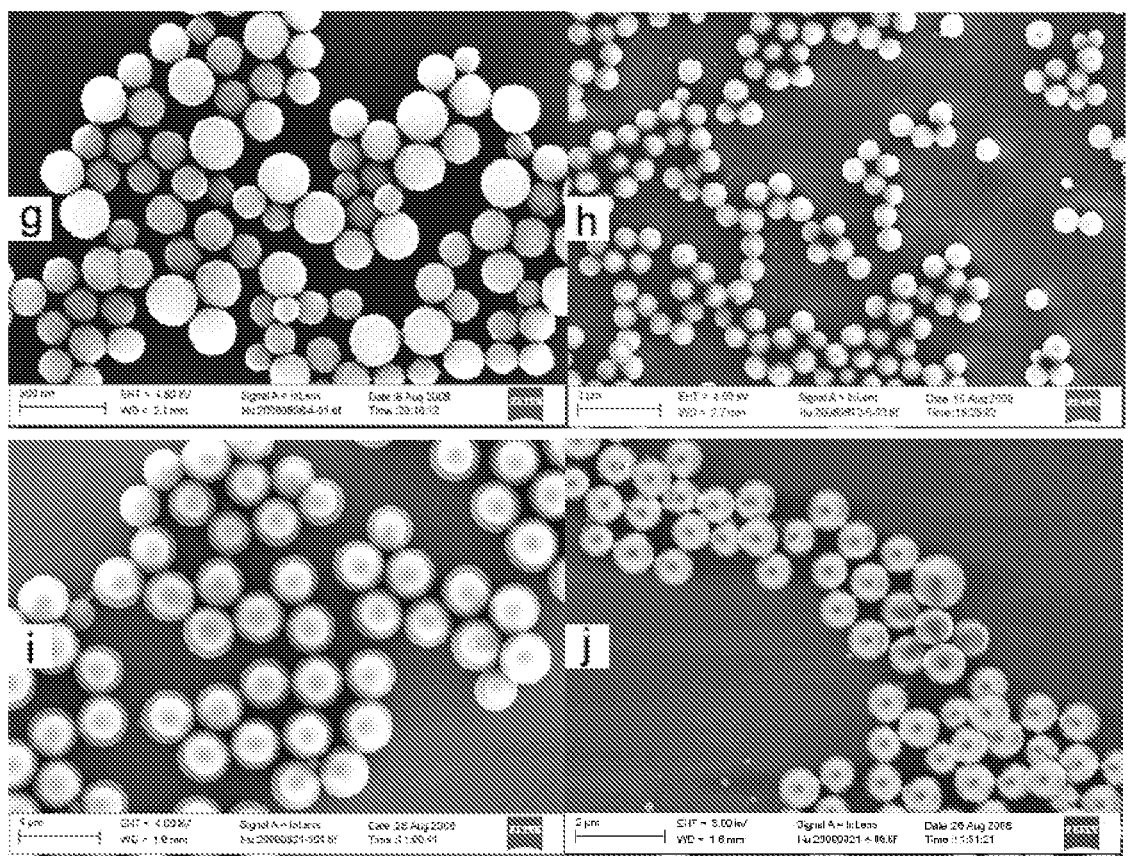
Figure 8:
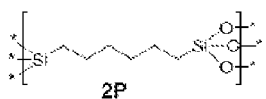
FIG. 8 shows SEM images of BPS nanoparticles 2P synthesized with different ratios of 1-PrOH in water: (a) 0%; (b) 5%; (c) 10%; (d) 12%; (e) 14%; (f) 16%; (g) 18%; (h) 20%.
Figure 8:
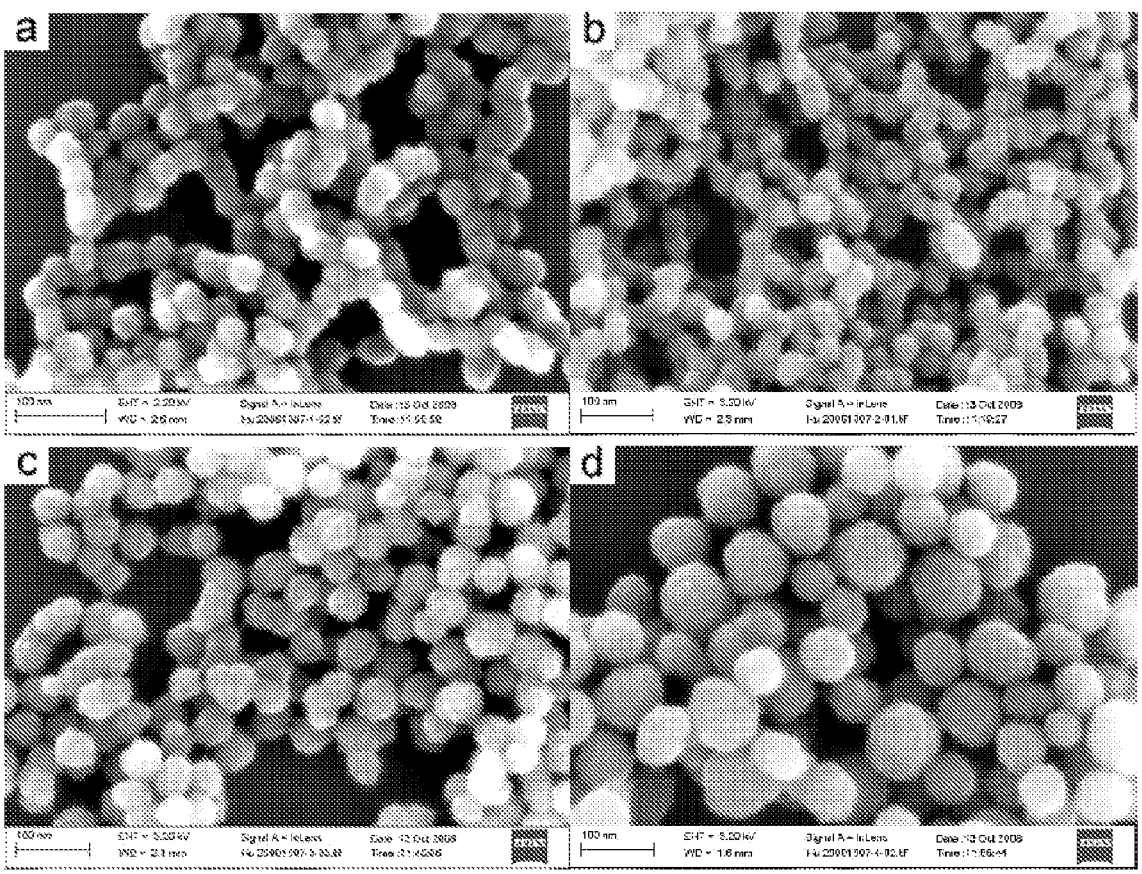
Figure 8:
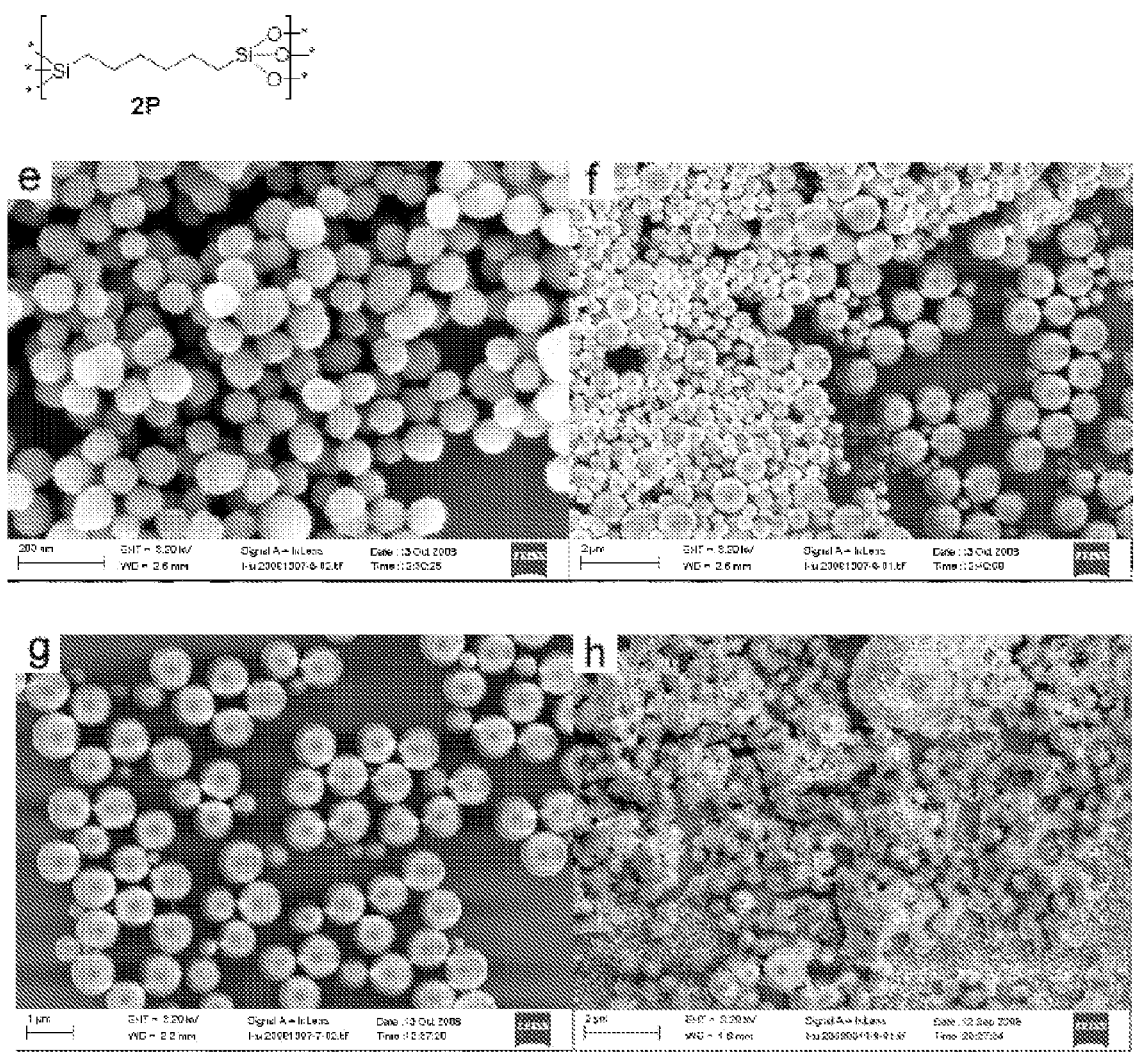

To test the effect of temperature, which can influence both reaction rate and monomer solubility, the synthesis of 1P from 1, was examined at 50° C. and 70° C. with various water-alcohol ratios as solvent. Generally, the particles prepared at 60° C. are larger and more uniform in size (SEE FIG. 6). Within this range, the influence of temperature on particle size is minor.

Example 5

Surface Area and Porosity

All nanoparticles exhibit a small component of microporosity (pore diameter <2 nm) which contributes to the total surface area (4-15 $m^2/g$ for "large" NPs, 20-40 $m^2/g$ for "small" NPs, Table 3). NPs synthesized in $NH_3$ solution with 0% 1-PrOH also have considerable mesoporosity, which is attributed in part to the interstitial spaces between particles (Table 4, FIG. 15). Thus, these "small" NPs can be also considered as bulk materials or clusters with high surface area and dual (meso- and micro-) porosity.

TABLE 4

Porosimetry data of BPS NPs of various composition and sizes.

| Entry | Material | 1-PrOH | $D_{avg}$ (nm, SEM) | Surface area ($m^2/g$) | Pore volume (mL/g) |
|---|---|---|---|---|---|
| 1 | 1P | 0% | 44 | 204 | 0.60 |
| 2 | 1P | 20% | 590 | 12 | 0.03 |
| 3 | 2P | 0% | 36 | 231 | 0.66 |
| 4 | 2P | 16% | 620 | 38 | 0.14 |
| 5 | 3P | 0% | 84 | 137 | 0.75 |
| 6 | 3P | 14% | 440 | 22 | 0.11 |

Example 6

Solid-State NMR Analysis

Figure 16:
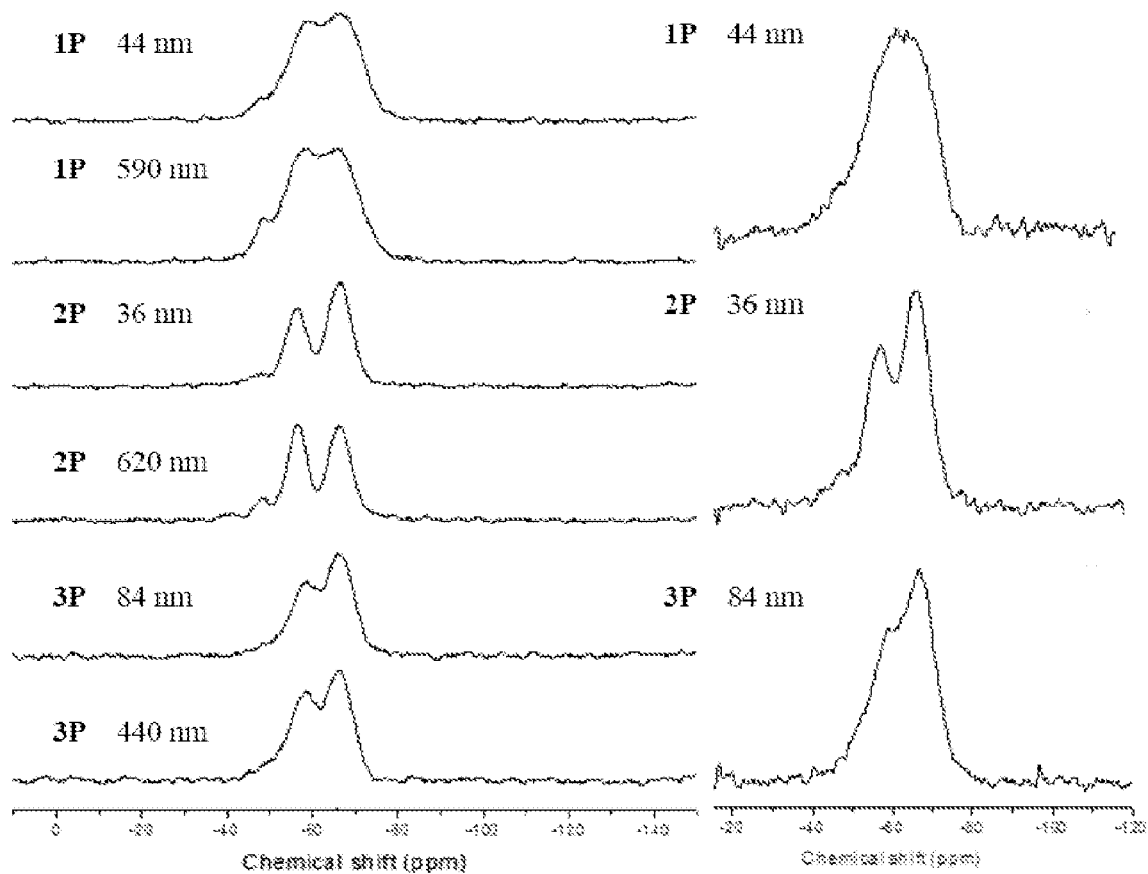
FIG. 16 shows solid state NMR spectra (left: $^{29}Si$ CP/MAS; right: single-pulse) of particles.

The spectral resolution ($^{29}$Si CP/MAS solid-state NMR) of the particles increases in the order 1P<3P<2P. 2P and 3P NPs synthesized without 1-PrOH, have a higher degree of condensation than particles of the same chemical composition but synthesized with 1-PrOH as co-solvent. This trend however is not observed for 1P, perhaps due to the greater error in calculating the condensation due to lower spectral resolution. Single-pulse experiments, only done on entries 1, 3, 5 in Table 4, suggests that the degree of condensation of particles is higher with monomers with a greater intrinsic solubility in water (3P>2P>1P) (SEE. FIG. 16, Table 5).

TABLE 5

Solid state NMR data of BPS NPs of various composition and sizes.

| | | | | Peak chem. Shift (ppm) | | | Peak Area (CP. %) | | | Peak Area (SP. %) | | |
|---|---|---|---|---|---|---|---|---|---|---|---|---|
| Entry | Material | 1-PrOH | $D_{avg}$ | $T^3$ | $T^2$ | $T^1$ | $T^3$ | $T^2$ | $T^1$ | $T^3$ | $T^2$ | $T^1$ |
| 1 | 1P | 0% | 44 | −67.2 | −57.9 | −48.9 | 54.8 | 37.6 | 7.6 | 60.7 | 22.9 | 16.4 |
| 2 | 1P | 20% | 588 | −66.1 | −56.7 | −48.3 | 56.8 | 35.1 | 8.1 | — | — | — |
| 3 | 2P | 0% | 36 | −66.3 | −56.4 | −48.3 | 56.9 | 34.3 | 8.8 | 62.4 | 26.3 | 11.3 |
| 4 | 2P | 16% | 619 | −66.3 | −56.5 | −48.6 | 50.1 | 41.1 | 8.9 | — | — | — |
| 5 | 3P | 0% | 84 | −66.4 | −58.3 | −52.8 | 58.2 | 29.9 | 11.9 | 60.4 | 39.6 | — |
| 6 | 3P | 14% | 439 | −66.4 | −58.2 | −51.4 | 51.6 | 37.1 | 11.3 | — | — | — |

Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

REFERENCES

All publications and patents listed below and/or mentioned in the above specification are herein incorporated by reference.

(1) (a) Shea, K. J.; Loy, D. A. *Chem. Mater.* 2001, 13, 3306-3319. (b) Shea, K. J.; Loy, D. A.; Webster, O. *J Am. Chem. Soc.* 1992, 114, 6700-6710.
(2) Shea, K. J.; Moreau, J.; Loy, D. A.; Corriu, R. J. P.; Boury, B. *Functional Hybrid Materials* 2004, 50, 50-85.
(3) Zhao, L.; Vaupel, M.; Loy, D. A.; Shea, K. J. *Chem. Mater.* 2008, 20, 1870-1876.
(4) Wright, J. D.; Sommerdijk, N. A. J. M. In *Sol-Gel Materials. Chemistry and Applications*; Phillips, D., O'Brien, P., Roberts, S., Eds.; CRC Press: New York, 2001; Vol. 4, p 43-53.
(5) (a) Unger, K. K.; Kumar, D.; Grun, M.; Buchel, G.; Ludtke, S.; Adam, T.; Schumacher, K.; Renker, S. *J. Chromatogr. A* 2000, 892, 47-55. (b) Smith, J. E.; Wang, L.; Tan, W. T. *TrAC, Trends Anal. Chem.* 2006, 25, 848-855. (c) Guihen, E.; Glennon, J. D. *Anal. Lett.* 2003, 36, 3309-3336.
(6) (a) Barbe, C. B., John; Kong, Linggen; Finnie, Kim; Lin, Hui Qiang; Larkin, Michael; Calleja, Sandrine; Bush, Alexandra; Calleja, Gerard *Adv. Mater.* 2004, 16, 1959-1966. (b) Singh, M.; Briones, M.; Ott, G.; O'Hagan, D. *Proc. Nat. Acad. Sci. U.S.A.* 2000, 97, 811-816. (c) Roy, I.; Ohulchanskyy, T. Y.; Bharali, D. J.; Pudavar, H. E.; Mistretta, R. A.; Kaur, N.; Prasad, P. N. *Proc. Nat. Acad. Sci. U.S.A.* 2005, 102, 279-284. (d) Bharali, D. J.; Klejbor, I.; Stachowiak, E. K.; Dutta, P.; Roy, I.; Kaur, N.; Bergey, E. J.; Prasad, P. N.; Stachowiak, M. K. *Proc. Nat. Acad. Sci. U.S.A.* 2005, 102, 11539-11544. (e) Roy, I.; Ohulchanskyy, T. Y.; Pudavar, H. E.; Bergey, E. J.; Oseroff, A. R.; Morgan, J.; Dougherty, T. J.; Prasad, P. N. *J. Am. Chem. Soc.* 2003, 125, 7860-7865. (f) Wang, C.; Ge, Q.; Ting, D.; Nguyen, D.; Shen, H. R.; Chen, J. Z.; Eisen, H. N.; Heller, J.; Langer, R.; Putnam, D. *Nat. Mater.* 2004, 3, 190-196. (g) Sengupta, S.; Eavarone, D.; Capila, I.; Zhao, G. L.; Watson, N.; Kiziltepe, T.; Sasisekharan, R. *Nature* 2005, 436, 568-572. (h) Haag, R. Angew. *Chem. Int. Ed.* 2004, 43, 278-282. (i) Yoon, T. J.; Kim, J. S.; Kim, B. G.; Yu, K. N.; Cho, M. H.; Lee, J. K. *Angew. Chem. Int. Ed.* 2005, 44, 1068-1071. (j) Yan, A. H.; Lau, B. W.; Weissman, B. S.; Kulaots, I.; Yang, N. Y. C.; Kane, A. B.; Hurt, R. H. *Adv. Mater.* 2006, 18, 2373.
(7) (a) Santra, S.; Bagwe, R. P.; Dutta, D.; Stanley, J. T.; Walter, G. A.; Tan, W.; Moudgil, B. M.; Mericle, R. A. *Adv. Mater.* 2005, 17, 2165-2169. (b) Lee, J.-H.; Jun, Y.-W.; Yeon, S.-I.; Shin, J.-S.; Cheon, J. *Angew. Chem. Int. Ed.* 2006, 45, 8160-8162.
(8) (a) Beydoun, D., Amal, R., Low, G., McEvoy, S. *J. Nanopart. Res.* 1999, 1, 439-458. (a) Zhong, C. J.; Maye, M. M. *Adv. Mater.* 2001, 13, 1507.
(9) (a) Zhu, M. Q.; Zhu, L. Y.; Han, J. J.; Wu, W. W.; Hurst, J. K.; Li, A. D. Q. *J. Am. Chem. Soc.* 2006, 128, 4303-4309. (b) Ow, H.; Larson, D. R.; Srivastava, M.; Baird, B. A.; Webb, W. W.; Wiesner, U. *Nano Lett.* 2005, 5, 113-117.
(10) (a) Kaltenpoth, G.; Himmelhaus, M.; Slansky, L.; Caruso, F.; Grunze, M. *Adv. Mater.* 2003, 15, 1113-1118. (b) Jang, J.; Nam, Y.; Yoon, H. *Adv. Mater.* 2005, 17, 1382-1386.
(11) (a) Yi, D. K.; Lee, S. S.; Papaefthymiou, G. C.; Ying, J. Y. *Chem. Matr.* 2006, 18, 614-619. (b) Lu, A. H.; Salabas, E. L.; Schuth, F. *Angew. Chem. Int. Ed.* 2007, 46, 1222-1244. (c) Toprak, M. S.; McKenna, B. J.; Mikhaylova, M.; Waite, J. H.; Stucky, G. D. *Adv. Mater.* 2007, 19, 1362. (d) Ma, Z. Y.; Guan, Y. P.; Liu, H. Z. J. *Polym. Sci., Part A: Polym. Chem* 2005, 43, 3433-3439. (e) Xu, H.; Cui, L. L.; Tong, N. H.; Gu, H. C. *J. Am. Chem. Soc.* 2006, 128, 15582-15583. (f) Lu, C. W.; Hung, Y.; Hsiao, J. K.; Yao, M.; Chung, T. H.; Lin, Y. S.; Wu, S. H.; Hsu, S. C.; Liu, H. M.; Mou, C. Y.; Yang, C. S.; Huang, D. M.; Chen, Y. C. *Nano Lett.* 2007, 7, 149-154.
(12) Zhao, L.; Loy, D. A.; Shea, K. J. *J. Am. Chem. Soc.* 2006, 128, 14250.
(13) Khiterer, M.; Shea, K. *J. Nano Lett.* 2007, 7, 2684-2687.
(14) Jain, V.; Khiterer, M.; Montazami, R.; Yochum, H.; Shea, K. J.; Heflin, R.; *ACS Appl. Mater. Interfaces,* 2009, 1, 83-89.
(15) Stober, W.; Fink, A.; Bohn, E. *J. Colloid Interface Sci.* 1968, 26, 62-69.
(16) (a) Choi, J. Y.; Kim, C. H.; Kim, D. K. *J. Am. Ceram. Soc.* 1998, 81, 1184-1188. (b) Katagiri, K.; Hasegawa, K.; Matsuda, A.; Tatsumisago, M.; Minami, T. *J. Am. Ceram. Soc.* 1998, 81, 2501-2503. (c) Matsuda, A.; Sasaki, T.; Tanaka, T.; Tatsumisago, M.; Minami, T. *J. Sol-Gel Sci. Technol.* 2002, 23, 247-252. (d) Liu, S. M.; Lang, X. M.; Ye, H.; Zhang, S. J.; Zhao, J. Q. *Eur. Polym.* 1 2005, 41, 996-1001. (e) Arkhireeva, A.; Hay, J. N. *J. Mater. Chem.* 2003, 13, 3122-3127. (f) Arkhireeva, A.; Hay, J. N.; Lane, J. M.; Manzano, M.; Masters, H.; Oware, W.; Shaw, S. J. *J. Sol-Gel Sci. Technol.* 2004, 31, 31-36.
(17) Reason for choosing 1-PrOH as co-solvent: full miscibility with $H_2O$, similarity with $H_2O$ in boiling point, hydrogen bonding characteristics and polarity.
(18) Loy, D. A.; Shea, K. *J. Chem. Rev.* 1995, 95, 1431-1442.
(19) Van Blaaderen, A.; Van Geest, J.; Vrij, A. *J. Colloid Interface Sci.* 1992, 154, 481-501.
(20) (a) Matsoukas, T.; Gulari, E., *J. Colloid Interface Sci.* 1988, 124, 252. (b) Matsoukas, T.; Gulari, E., *J. Colloid Interface Sci.* 1989, 132, 13. (c) Matsoukas, T., and Gulari, E., *J. Colloid Interface Sci.* 1991, 145, 557.
(21) (a) Kim, S.; Zukoski, C. F., *J. Colloid Interface Sci.* 1990, 139, 198. (b) Bogush, G. H.; Zukoski, C. F., IV, *J. Colloid Interface Sci.* 1991, 142, 1. (c) Bogush, G. H.; Zukoski, C. F., IV, *J. Colloid Interface Sci.* 1991, 142, 17.
(22) Green, D. L.; Lin, J. S.; Lam, Y.-F.; Hu, M. Z.-C.; Schaefer, D. W.; Harris, M. T. *J. Colloid Interface Sci.* 2003, 266, 346-358.
(23) (a) Murata, M.; Yamasaki, H.; Ueta, T.; Nagata, M.; Ishikura, M.; Watanabe, S.; Masuda, Y. *Tetrahedron* 2007, 63, 4087-4094. (b) Cerveau, G.; Chappellet, S.; Corriu, R. J. P.; Dabiens, B. *J. Organomet. Chem.* 2001, 626, 92-99.

We claim:

1. A method of preparing monodisperse organic-silica microparticles and/or nanoparticles comprising:
    a) providing:
       i) a solution of ammonia, water, and alcohol, wherein said alcohol is about 2% to about 24% volume percent of said solution, and
       ii) bridged silane monomers; and
    b) mixing said solution and said bridged silane monomers and treating under conditions such that a population of monodisperse organic-silica microparticles and/or nanoparticles are generated, wherein said organic-silica microparticles and/or nanoparticles are spherical and/or substantially spherical.

2. The method of claim 1, wherein said mixing is performed above room temperature.

3. The method of claim 2, wherein said mixing is performed at approximately 60° C.

4. The method of claim 2, wherein said treating comprises allowing said suspension to cool to room temperature.

5. The method wherein said alcohol comprises 1-propanol.

6. The method of claim 1, wherein said organic-silica microparticles and/or nanoparticles are less than 1.5 µm in diameter.

7. The method of claim 6, wherein said organic-silica microparticles and/or nanoparticles are greater than 15 nm in diameter.

8. The method of claim 1, wherein said bridged silane monomers comprise methoxysilyl groups.

9. The method of claim 1, wherein said solution is surfactant-free.

* * * * *